(12) United States Patent
Tamura

(10) Patent No.: US 10,175,928 B2
(45) Date of Patent: Jan. 8, 2019

(54) IMAGE MANAGEMENT SYSTEM, COMMUNICATION TERMINAL, COMMUNICATION SYSTEM, IMAGE MANAGEMENT METHOD AND RECORDING MEDIUM

(71) Applicant: Hideki Tamura, Kanagawa (JP)

(72) Inventor: Hideki Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 68 days.

(21) Appl. No.: 14/960,999

(22) Filed: Dec. 7, 2015

(65) Prior Publication Data

US 2016/0170704 A1    Jun. 16, 2016

(30) Foreign Application Priority Data

Dec. 10, 2014 (JP) .................................. 2014-249811

(51) Int. Cl.
*G06F 3/14* (2006.01)
*H04N 7/15* (2006.01)
(Continued)

(52) U.S. Cl.
CPC .............. *G06F 3/1454* (2013.01); *G09G 5/12* (2013.01); *H04N 7/152* (2013.01); *H04N 7/155* (2013.01); *H04M 3/567* (2013.01)

(58) Field of Classification Search
CPC ........... G09G 2300/02; G09G 2370/02; G09G 2370/022; G09G 2370/025;
(Continued)

(56) References Cited

U.S. PATENT DOCUMENTS 5,894,305 A * 4/1999 Needham ............ H04L 12/1822
709/220
6,463,460 B1    10/2002 Simonoff
(Continued)

FOREIGN PATENT DOCUMENTS

CN        1555197 A      12/2004
JP     2006-31359 A       2/2006
(Continued)

OTHER PUBLICATIONS

Extended European Search Report dated Apr. 7, 2016 in Patent Application No. 15198360.8.
(Continued)

*Primary Examiner* — Gene W Lee
(74) *Attorney, Agent, or Firm* — Oblon, McClelland, Maier & Neustadt, L.L.P.

(57) ABSTRACT

An image management system includes an image management unit configured to manage at least a piece of image information among pieces of information transmitted in a session between a plurality of communication terminals, the piece of image information being related to an image output at each of the communication terminals; and a transmission unit configured to send the piece of image information managed by the image management unit to a first communication terminal configured to output an image based on the piece of image information.

13 Claims, 23 Drawing Sheets

(51) Int. Cl.
*G09G 5/12* (2006.01)
*H04M 3/56* (2006.01)

(58) Field of Classification Search
CPC ......... G09G 2370/04; G09G 2370/042; G09G 2370/16; G09G 2370/20; G09G 2360/04
See application file for complete search history.

(56) References Cited

U.S. PATENT DOCUMENTS

| | | | |
|---|---|---|---|
| 7,136,387 B2* | 11/2006 | Gallant | H04L 12/6418 |
| | | | 370/395.52 |
| 7,584,431 B2 | 9/2009 | Kazushige et al. | |
| 7,792,773 B2* | 9/2010 | McCord | H04M 3/5233 |
| | | | 706/47 |
| 9,043,399 B2 | 5/2015 | Umehara | |
| 9,335,860 B2* | 5/2016 | Nagahara | G06F 3/0488 |
| 9,430,140 B2* | 8/2016 | Reuschel | G06F 3/04883 |
| 2004/0083195 A1* | 4/2004 | McCord | H04M 3/5233 |
| | | | 706/47 |
| 2004/0148331 A1* | 7/2004 | Watanabe | H04L 29/06 |
| | | | 709/200 |
| 2005/0086344 A1* | 4/2005 | Suesserman | H04L 67/34 |
| | | | 709/227 |
| 2006/0092178 A1 | 5/2006 | Tanguay, Jr. et al. | |
| 2007/0003254 A1 | 1/2007 | Honobe | |
| 2007/0216660 A1 | 9/2007 | Sposato et al. | |
| 2007/0291667 A1* | 12/2007 | Huber | H04L 29/06027 |
| | | | 370/260 |
| 2007/0294263 A1* | 12/2007 | Punj | H04M 3/493 |
| 2008/0294763 A1* | 11/2008 | Uchida | G06F 3/1454 |
| | | | 709/223 |
| 2011/0061005 A1* | 3/2011 | Zha | H04L 12/1818 |
| | | | 715/753 |
| 2013/0063547 A1* | 3/2013 | Kasuya | H04L 12/1813 |
| | | | 348/14.08 |
| 2013/0117373 A1 | 5/2013 | Umehara | |
| 2014/0129641 A1 | 5/2014 | Umehara | |
| 2015/0256998 A1 | 9/2015 | Umehara | |

FOREIGN PATENT DOCUMENTS

| | | |
|---|---|---|
| JP | 2008-102613 | 5/2008 |
| JP | 4241053 | 3/2009 |
| JP | 2010-239469 | 10/2010 |
| JP | 2012-43380 | 3/2012 |
| JP | 2012-050063 | 3/2012 |
| JP | 2013-225846 | 10/2013 |
| WO | WO 2013/137367 A1 | 9/2013 |

OTHER PUBLICATIONS

Dipl.-Ing. Markus Zeller, et al., "Transcoding, with an Emphasis on Video, Taking the Example of a Cross-Standard MCU for Broadband and Narrowband Communication", Displays and Vacuum Electronics, XP-000791055, 1997, pp. 115-120 (with English language translation).

* cited by examiner

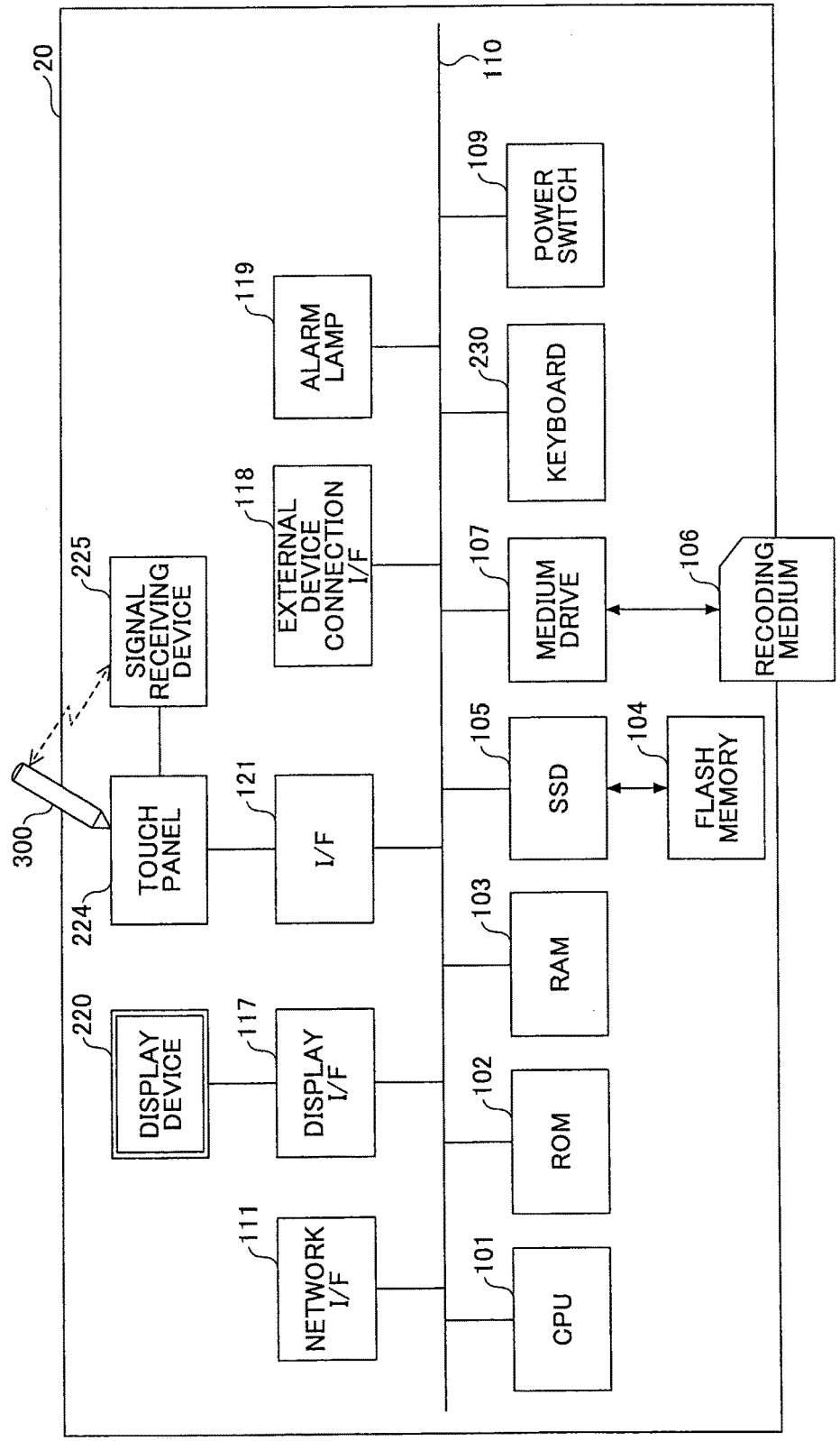

FIG.6
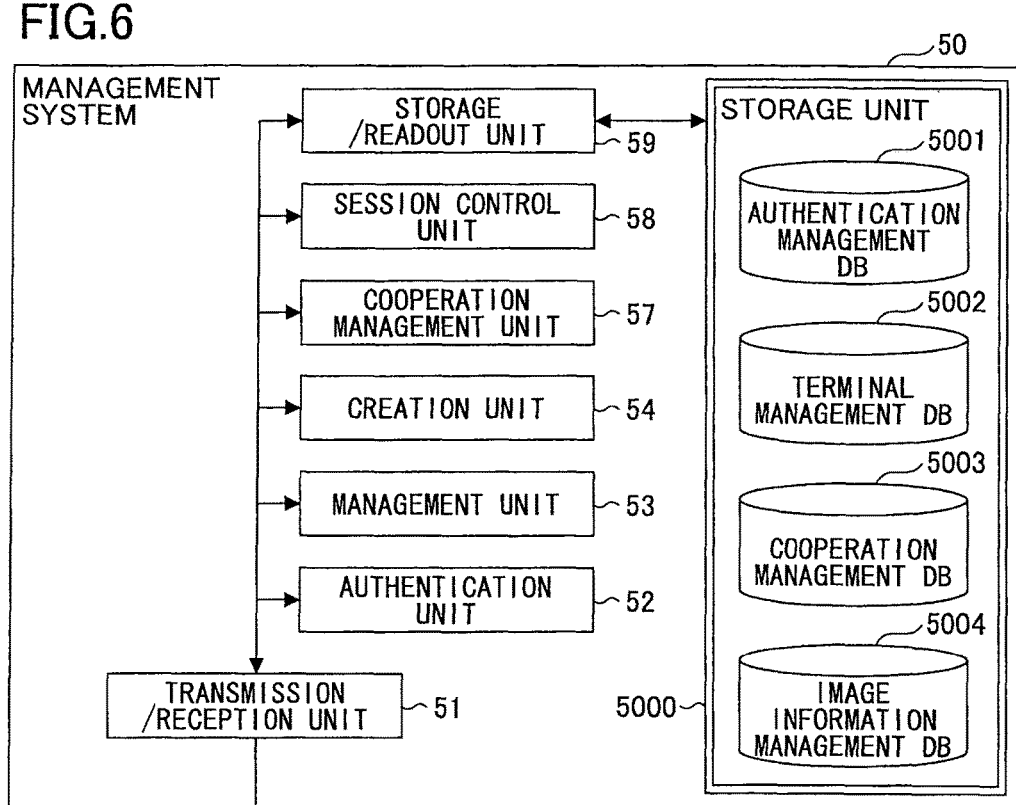
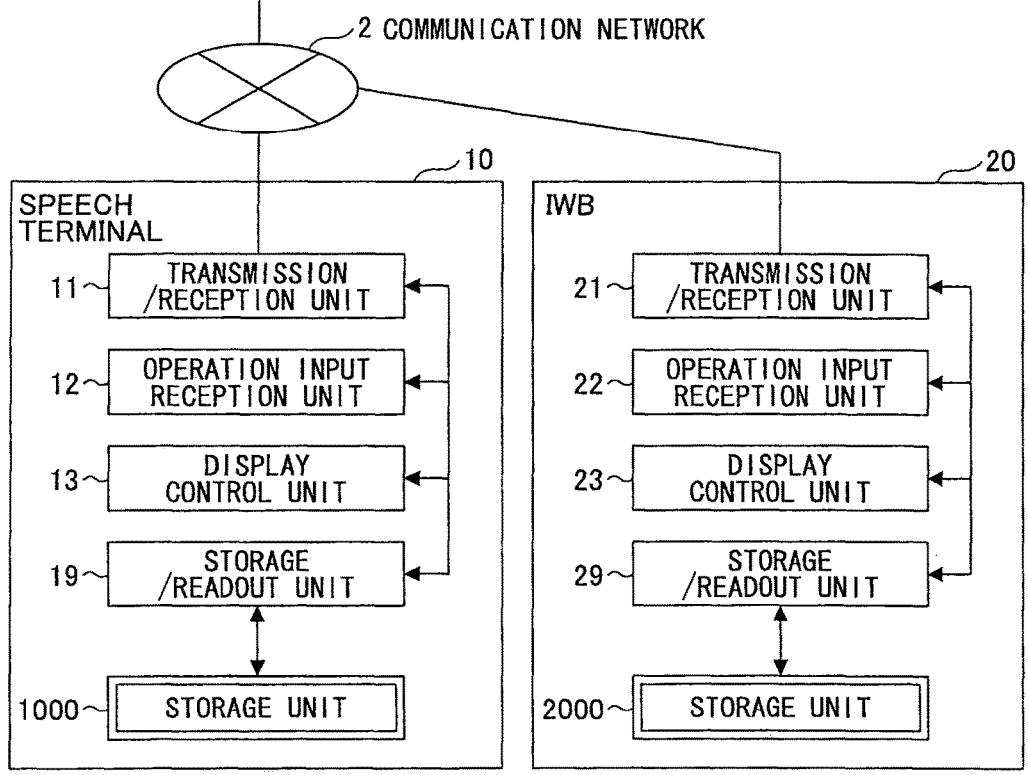

FIG.7A

| COMMUNICATION ID | PASSWORD |
|---|---|
| 01a | aaaa |
| ... | ... |
| 02b | baba |
| ... | ... |

FIG.7B

| COMMUNICATION ID | NAME OF TERMINAL | OPERATION STATE |
|---|---|---|
| 01a | SPEECH TERMINAL (LOCATION A) | ON LINE (COMMUNICATION OK) |
| 01b | SPEECH TERMINAL (LOCATION B) | ON LINE (COMMUNICATION OK) |
| 01c | SPEECH TERMINAL (LOCATION C) | ON LINE (COMMUNICATION OK) |
| ... | ... | ... |
| 02a | IWB (LOCATION A) | ON LINE (COMMUNICATION OK) |
| 02b | IWB (LOCATION B) | ON LINE (COMMUNICATION OK) |
| 02c | IWB (LOCATION C) | ON LINE (COMMUNICATION OK) |
| ... | ... | ... |

FIG.7C

| SPEECH TERMINAL COMMUNICATION ID | IWB COMMUNICATION ID | ... COMMUNICATION ID |
|---|---|---|
| 01a | 02a | ... |
| 01b | 02b | ... |
| 01c | 02c | ... |
| ... | ... | ... |

FIG.7D

SESSION ID = se01

| | SHEET No. = 1 | | | | SHEET No. = 2 | | |
|---|---|---|---|---|---|---|---|
| IMAGE NUMBER | IMAGE INFORMATION | COMMUNICATION ID | TIME | IMAGE INFORMATION | COMMUNICATION ID | TIME | |
| 1 | LINE (···) | 02a | 2014/9/1 13:20:30 | TEXT (···) | 02a | 2014/9/1 13:32:31 | ⋮ |
| 2 | CIRCLE (···) | 02c | 2014/9/1 13:22:10 | TEXT (···) | 02c | 2014/9/1 13:42:17 | ⋮ |
| 3 | DELETE (···) | 02a | 2014/9/1 13:26:11 | LINE (···) | 02b | 2014/9/1 13:43:44 | ⋮ |
| ⋮ | ⋮ | ⋮ | ⋮ | ⋮ | ⋮ | ⋮ | ⋮ |
| N1 | TEXT (···) | 02a | 2014/9/1 13:33:13 | EOS | | | ⋮ |
| ⋮ | ⋮ | ⋮ | ⋮ | | | | ⋮ |
| N2 | EOS | | | | | | ⋮ |

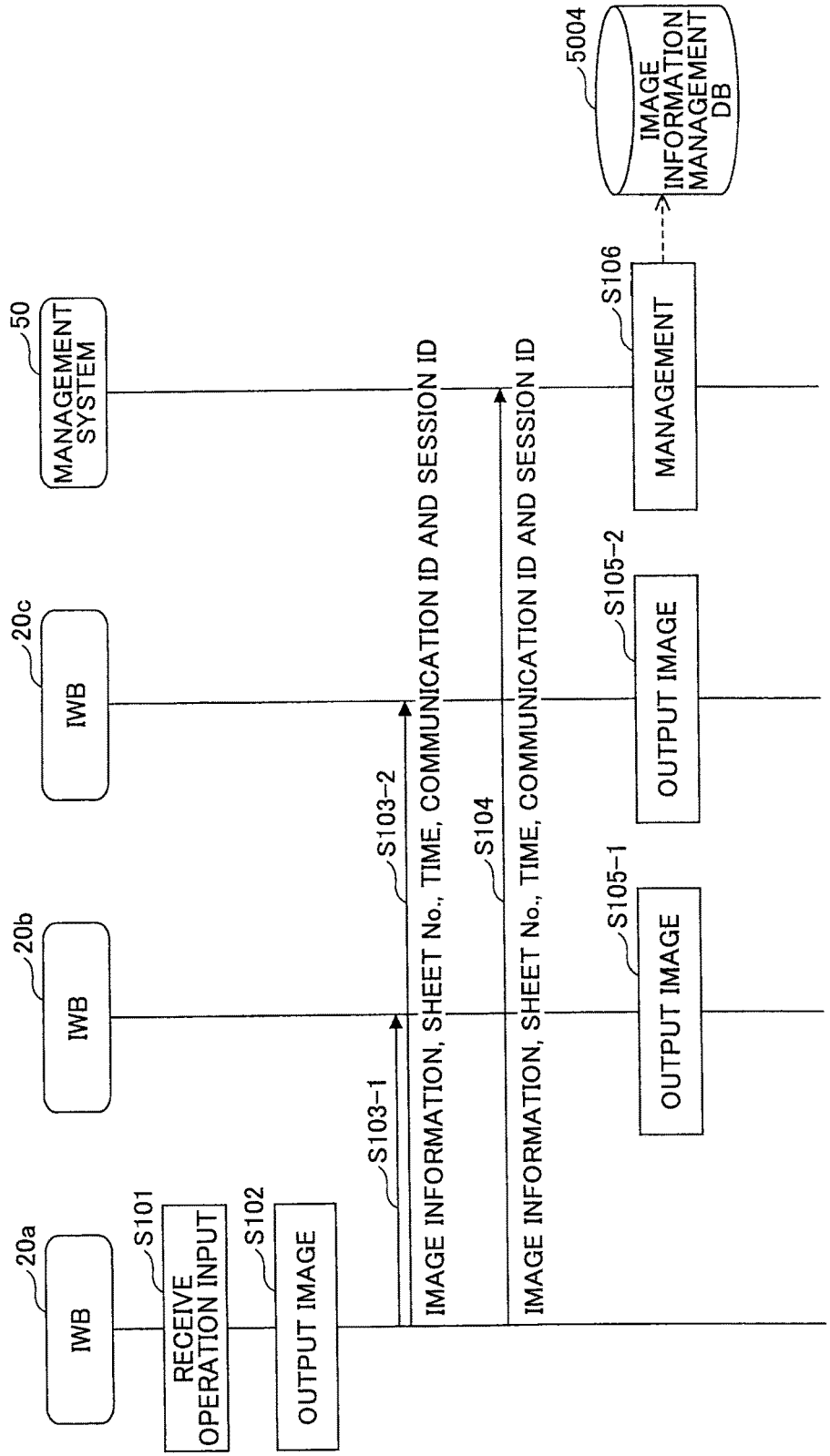

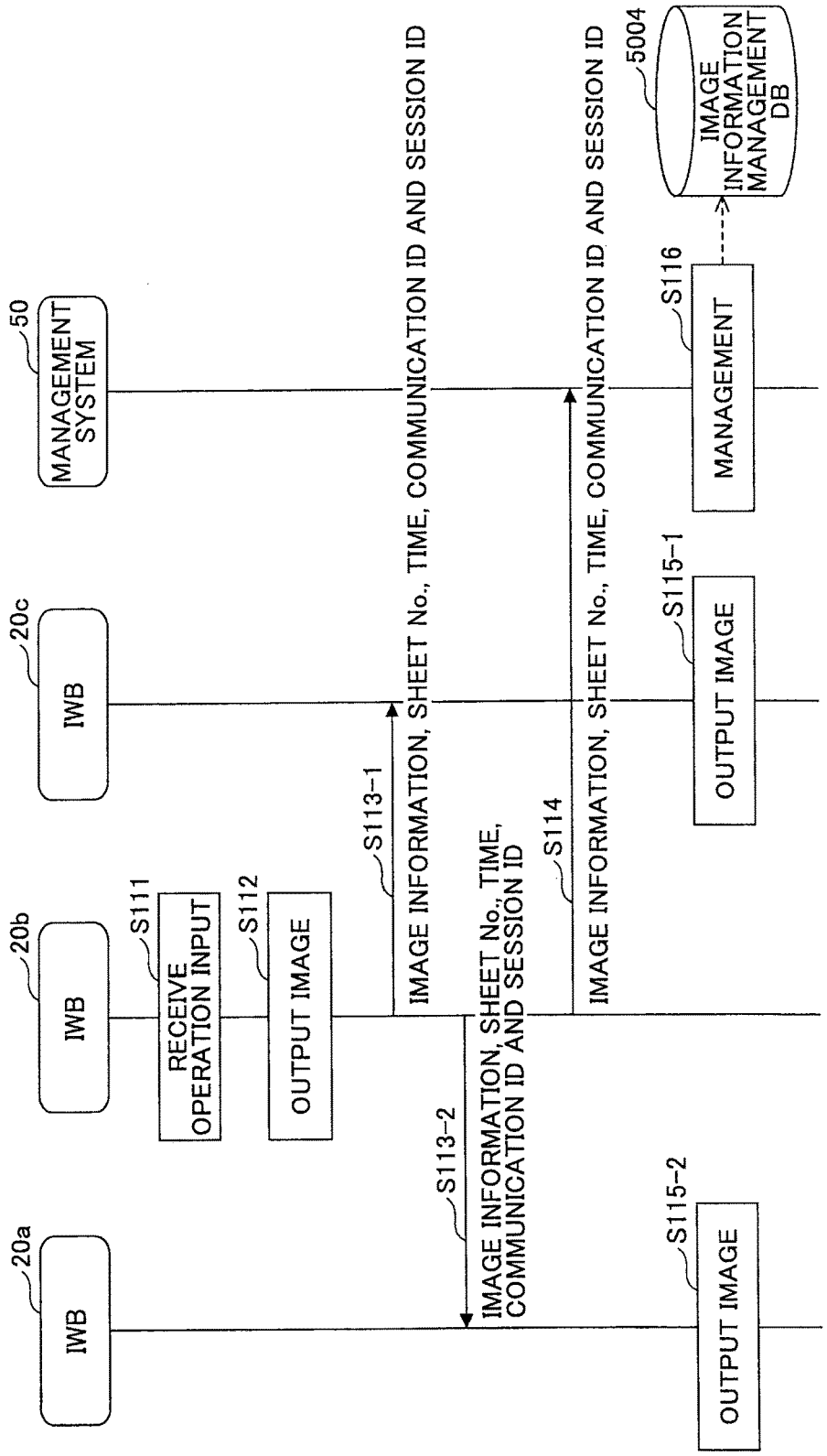

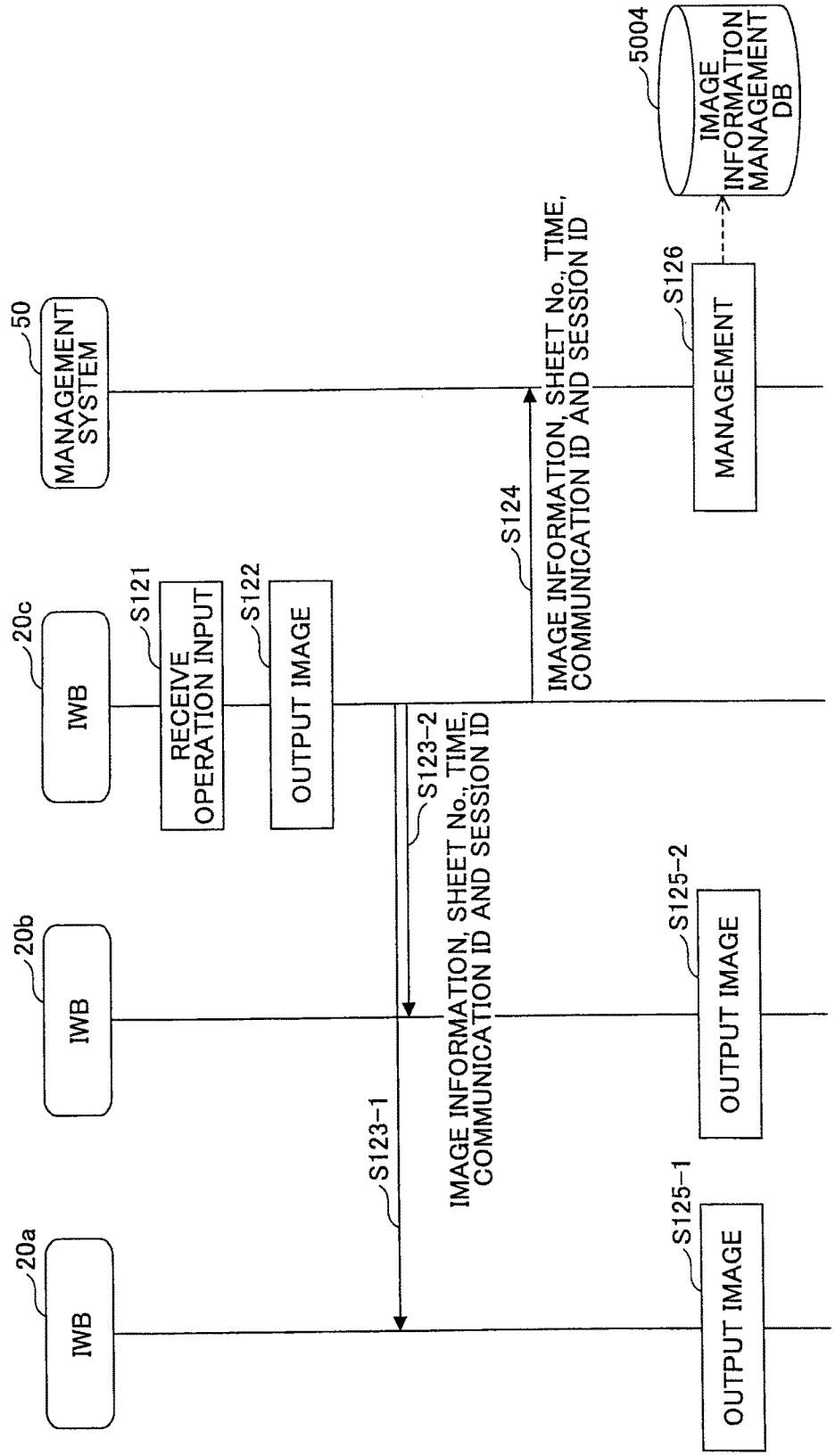

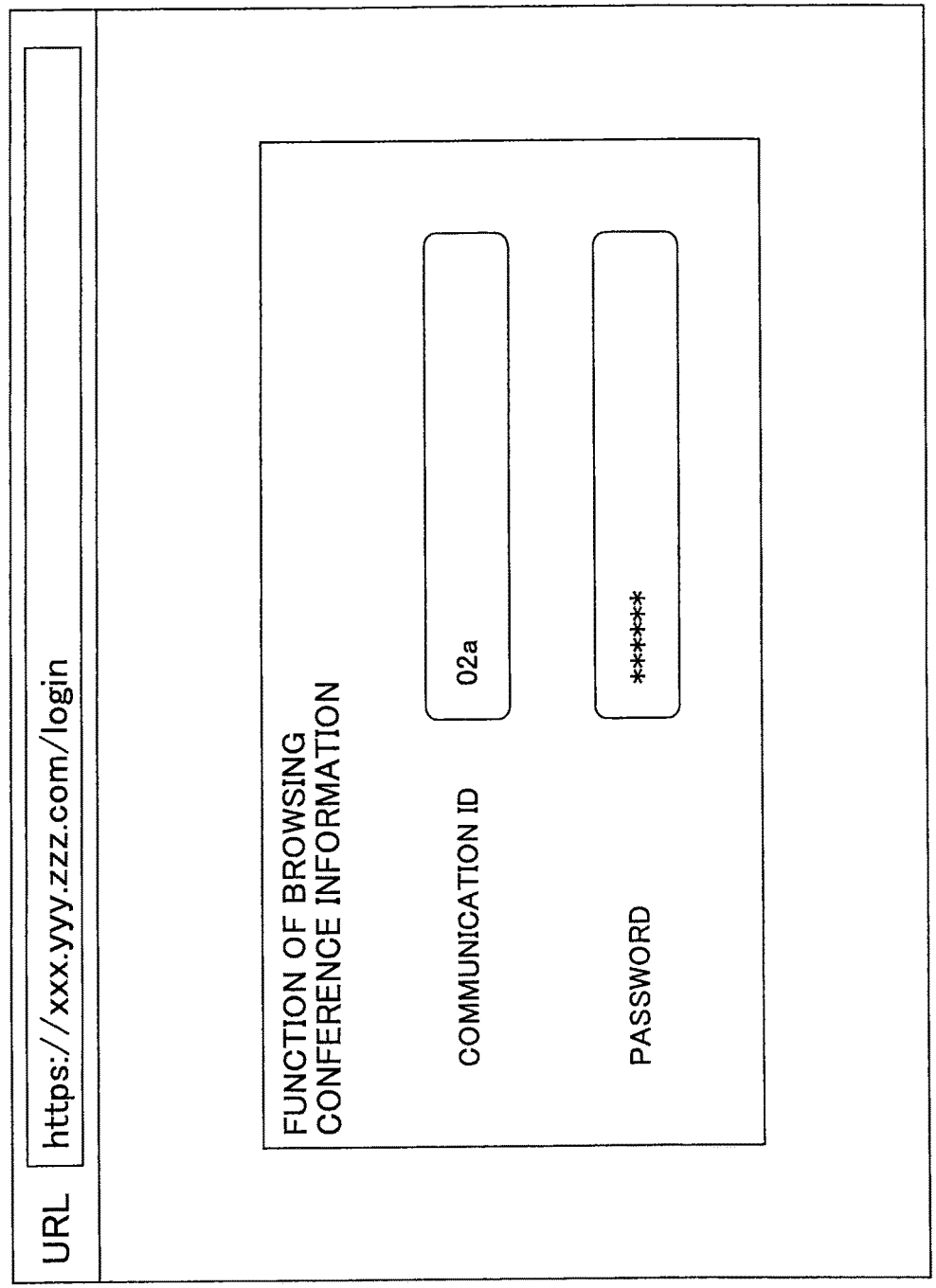

FIG.13B

URL https://xxx.yyy.zzz.com/meetinglog

HISTORY OF CONFERENCES

| DATE AND TIME OF PARTICIPATION | HOURS OF PARTICIPATION | NUMBER OF LOCATIONS | DETAILED INFORMATION OF CONFERENCE | WHITEBOARD INFORMATION |
|---|---|---|---|---|
| 2014/9/1 9:44:50 | 00:32:33 | 3 | REFERENCE | REFERENCE |
| 2014/9/9 13:03:25 | 01:15:23 | 4 | REFERENCE | REFERENCE |
| ... | ... | ... | ... | ... |

FIG.14

URL | https://xxx.yyy.zzz.com/meetinglog/wb

WHITEBOARD SHARING SCREEN

CONFERENCE INFORMATION

| DATE AND TIME OF PARTICIPATION | HOURS OF PARTICIPATION | NUMBER OF LOCATIONS | PARTICIPATING TERMINAL |
|---|---|---|---|
| 2014/9/1 9:44:50 | 00:32:33 | 3 | 02a, 02b, 02c |

SHEET 1 / SHEET 2 / SHEET 3

ABC

NAME OF LOCATION
○ DISPLAY
◉ NOT DISPLAY

FIG. 16

URL | https://xxx.yyy.zzz.com/meetinglog/wb

WHITEBOARD SHARING SCREEN

CONFERENCE INFORMATION

| DATE AND TIME OF PARTICIPATION | HOURS OF PARTICIPATION | NUMBER OF LOCATIONS | PARTICIPATING TERMINAL |
|---|---|---|---|
| 2014/9/1 9:44:50 | 00:32:33 | 3 | 02a, 02b, 02c |

SHEET 1 | SHEET 2 | SHEET 3

02b
02a
02c ABC
02a
02b

220b

NAME OF LOCATION
⦿ DISPLAY
○ NOT DISPLAY

IMAGE MANAGEMENT SYSTEM, COMMUNICATION TERMINAL, COMMUNICATION SYSTEM, IMAGE MANAGEMENT METHOD AND RECORDING MEDIUM

CROSS-REFERENCE TO RELATED APPLICATIONS

The present application claims priority under 35 U.S.C. § 119 to Japanese Patent Application No. 2014-249811, filed Dec. 10, 2014. The contents of this application are incorporated herein by reference in their entirety.

BACKGROUND OF THE INVENTION

1. Field of the Invention

The disclosures herein generally relate to an image management system, a communication terminal, a communication system, an image management method and a computer readable recording medium storing a program for causing a computer to execute a process.

2. Description of the Related Art

Communication systems that perform a telephone call, a video conference or the like via a communication network such as the Internet or a dedicated line have become popular in recent years due to a demand for reducing travel costs and time of parties. In such a communication system when communication starts between communication terminals, content data such as image data or sound data are sent/received, thereby realizing communication between bases. Moreover, in order to perform the communication between bases smoothly, a method for sharing other content between bases in addition to content for a telephone call has been proposed.

For example, Japanese Patent No. 4241053 discloses a method for controlling a session so as to send/receive sounds to/from a terminal device of a communication partner, and furthermore for controlling a session so as to send/received images or handwritten data to/from the terminal device of the communication partner, thereby realizing voice sound with indicating images.

Moreover, Japanese Patent No. 4241053 discloses a terminal device provided with a secondary storage device including a non-volatile memory such as a flash memory or a hard disk. The secondary storage device stores data such as handwritten data that is not desired to be lost even when the power is turned off.

SUMMARY OF THE INVENTION

It is a general object of at least one embodiment of the present invention to provide an image management system, a communication terminal, a communication system, an image management method and a computer-readable recording medium storing a program for causing a computer to execute a process that substantially obviate one or more problems caused by the limitations and disadvantages of the related art.

In one embodiment, an image management system includes an image management unit configured to manage at least a piece of image information among pieces of information transmitted in a session between a plurality of communication terminals, the piece of image information being related to an image output at each of the communication terminals; and a transmission unit configured to send the piece of image information managed by the image management unit to a first communication terminal configured to output an image based on the piece of image information.

In another embodiment, a communication terminal includes a reception unit configured to receive, from an image management system, a piece of image information; and an output control unit configured to control an output of an image based on the piece of image information received by the reception unit. The image management system includes an image management unit configured to manage at least a piece of image information among pieces of information transmitted in a session between the plurality of communication terminals, the piece of image information being related to an image output at each of the communication terminals; and a transmission unit configured to send the piece of image information managed by the image management unit to the communication terminal.

In yet another embodiment, a communication system includes a plurality of communication terminals including a first communication terminal; and an image management system which includes an image management unit configured to manage at least a piece of image information among pieces of information transmitted in a session between the communication terminals, the piece of image information being related to an image output at each of the communication terminals; and a transmission unit configured to send the piece of image information managed by the image management unit to a first communication terminal configured to output an image based on the piece of image information.

In still another embodiment, an image management method includes adding, to pieces of image information managed by an image management unit in an image management system, at least a piece of image information among the pieces of information transmitted in a session between a plurality of communication terminals, the piece of image information being related to an image output at each of the communication terminals; and sending the piece of image information managed by the image management unit to a first communication terminal configured to output an image based on the piece of image information.

In yet another embodiment, a non-transitory computer-readable storage medium stores a program for causing a computer of an image management system to execute a process of managing an image. The process includes adding, to pieces of image information managed by an image management unit in the image management system, at least a piece of image information among pieces of information transmitted in a session between a plurality of communication terminals, the piece of image information being related to an image output at each of the communication terminals; and sending the piece of image information managed by the image management unit to a first communication terminal configured to output an image based on the piece of image information.

BRIEF DESCRIPTION OF THE DRAWINGS

Other objects and further features of embodiments will become apparent from the following detailed description when read in conjunction with the accompanying drawings, in which:

FIGS. 4A and 4B are hardware configuration diagrams illustrating an example of the speech terminal and the interactive whiteboard according to the present embodiment;

FIG. 6 is functional block diagrams illustrating an example of the speech terminal, the interactive whiteboard and the management system according to the present embodiment;

FIGS. 7A to 7D are conceptual diagrams illustrating an example of respective management tables managed in the management system according to the present embodiment;

FIGS. 10A to 10C are sequence diagrams illustrating an example of processes of sending image information between the interactive whiteboards according to the present embodiment;

FIGS. 13A and 13B are views illustrating an example of a displayed image according to the present embodiment;

FIG. 14 is a view illustrating another example of the displayed image according to the present embodiment;

FIG. 16 is a view illustrating still another example of the displayed image according to the present embodiment.

DESCRIPTION OF THE PREFERRED EMBODIMENTS

In the following, embodiments of the present invention will be described with reference to the accompanying drawings.

General Arrangement of Embodiment

Figure 1:
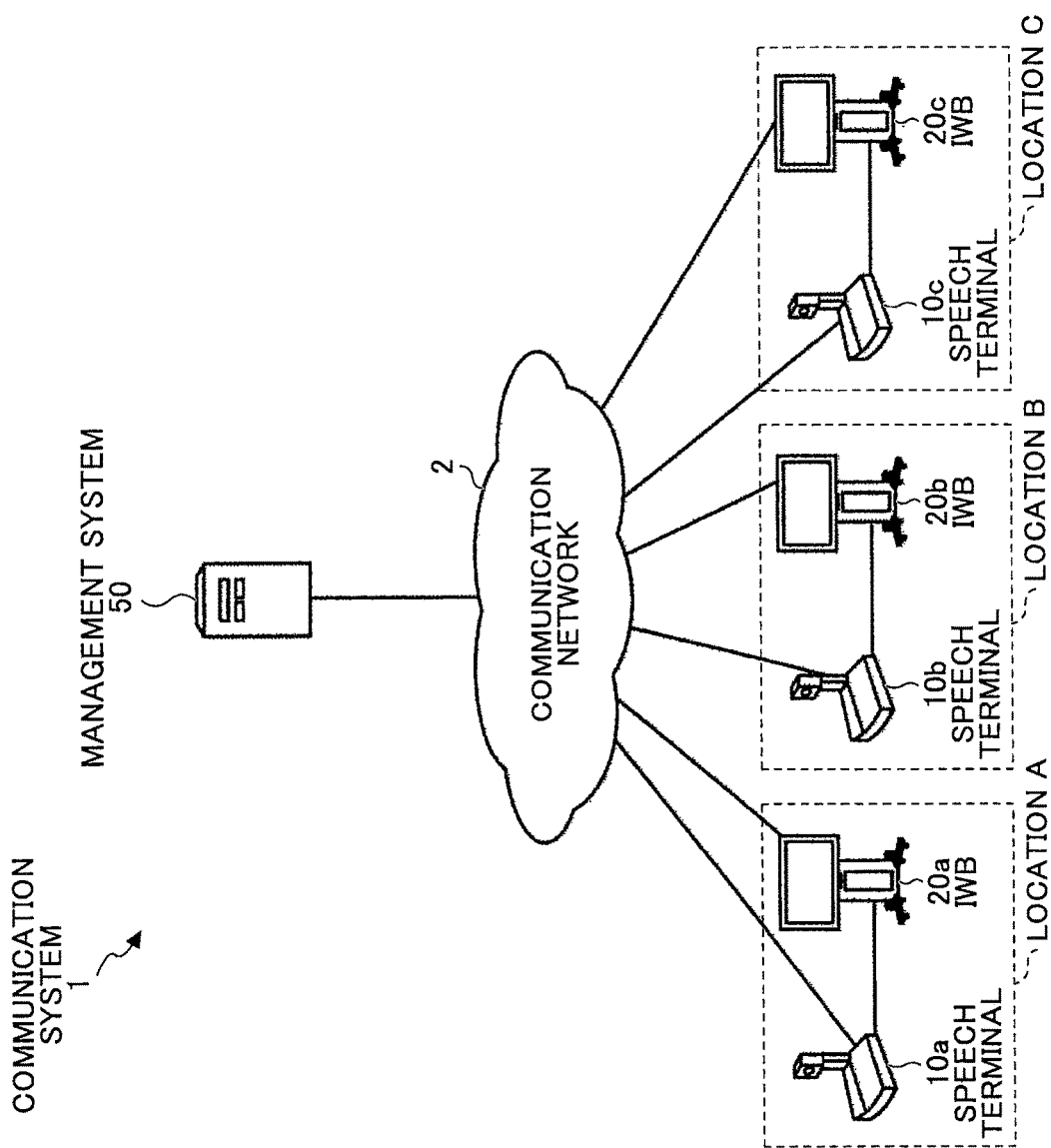
FIG. 1 is a schematic view illustrating an example of a communication system according to a present embodiment.

FIG. 1 is a schematic view illustrating a communication system according to an embodiment of the present invention. As shown in FIG. 1, the communication system 1 includes communication terminals such as video conference terminals (10a, 10b, 10c), interactive whiteboards (in the following, denoted as "IWB") as an example of image sharing devices (20a, 20b, 20c) and a management system 50 for managing the respective communication terminals 10. In the following, in a case of representing an arbitrary communication terminal of the video conference terminals (10a, 10b, 10c), it is denoted as a speech terminal 10. Moreover, in a case of representing an arbitrary IWB of the IWBs (20a, 20b, 20c), it is denoted as an IWB 20. The management system 50 is a computer provided with a server function.

By the communication system 1, speech communication can be performed between users of the speech terminals (10a, 10b, 10c). The speech communication can be realized by sound or sound and video (image). Moreover, an image in which a character, a figure, a symbol or the like is drawn can be shared among users of the IWBs (20a, 20b, 20c).

Moreover, the speech terminal 10, the IWB 20 and the management system 50 can perform communication by a communication network such as the Internet, a mobile telephone network or a LAN (Local Area Network). At each of locations (A, B, C), a speech terminal 10 and an IWB 20 are arranged, and a video conference can be performed between the locations by using both the speech terminal 10 and the IWB 20. Meanwhile, in FIG. 1, in order to make explanation simple, at each of the locations (A, B, C), one speech terminal 10 and one IWB 20 are shown. But, plural terminals or plural IWBs may be arranged. Moreover, at each of the locations (A, B, C), for example, a communication terminal other than the speech terminal 10 and the IWB 20, such as a projector or a digital signage device may be arranged for a communications connection via the communication network 2.

Hardware Configuration of the Embodiment

Figure 2:
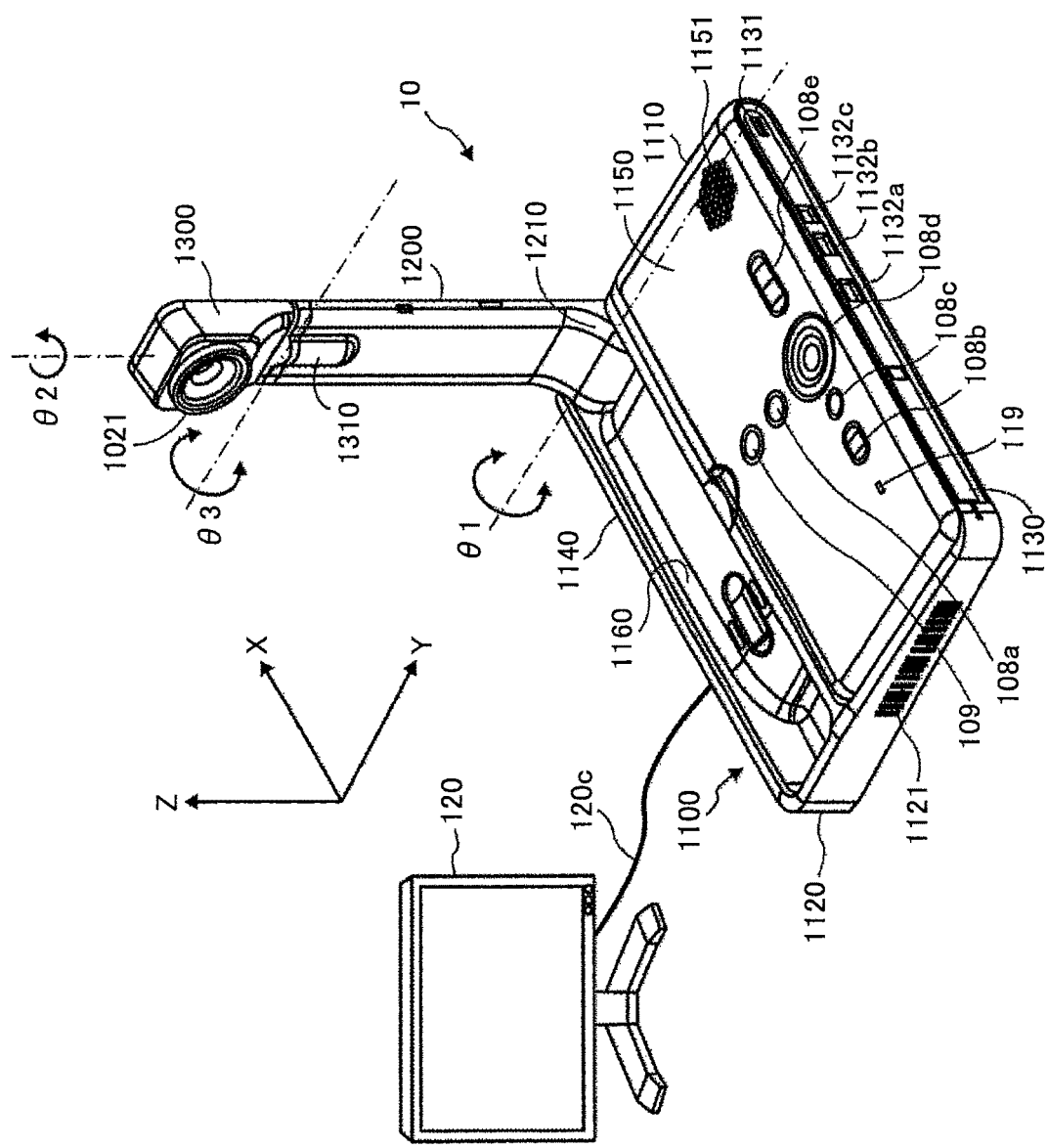
FIG. 2 is an external view illustrating an example of a speech terminal according to the present embodiment.

Next, a hardware configuration of the present embodiment will be described. FIG. 2 is an external view of a speech terminal 10 according to the present embodiment. As illustrated in FIG. 2, the speech terminal 10 includes a casing 1100, an arm 1200 and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving a cooling fan included in the casing 1100, air behind the speech terminal 10 can be taken in via the inlet face and exhausted to the rear of the speech terminal 10 via the exhaust face 1121. A right-side wall 1130 of the casing 1100 has a sound pickup hole 1131, and a built-in microphone 114, described later, is capable of picking up voice, sound, noise or the like.

An operation panel 1150 is formed toward the right-side wall 1130 of the casing 1100. The operation panel 1150 has a plurality of operation buttons (108a to 108e) described later, a power switch 109 described later, and an alarm lamp 119 described later. The operation panel 1150 also has a sound output face 1151, which is formed of a plurality of sound output holes for allowing output sound from a built-in speaker 115, described later, to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port for electrically connecting a cable 120c for a display device 120 to the external device connection I/F 118 described later is provided toward the left-side wall 1140 of the casing 1100.

Meanwhile, the following description uses the term "operation button 108" for indicating an arbitrary one of the operation buttons (108a to 108e), and the term "connection port 1132" for indicating an arbitrary one of the connection ports (1132a to 1132c).

Next, the arm 1200 is attached to the casing 1100 via a torque hinge 1210 and is configured to be rotatable in the vertical direction within a range of a tilt angle θ1 of 135 degrees with respect to the casing 1100. FIG. 2 indicates a state in which the tilt angle θ1 is 90 degrees. The camera housing 1300 has a built-in camera 112, which will be described later, and the camera 112 can capture an image of a user, a document, a room, or the like. In addition, the camera housing 1300 has a torque hinge 1310. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the arm 1200, where the state illustrated in FIG. 3 is 0 degrees.

Meanwhile, the external view illustrated in FIG. 2 is only exemplary and the appearance is not restricted. The speech terminal 10 may be, for example, a generic PC, a smart phone, a tablet terminal or the like. The camera 112 and the microphone 114 need not necessarily be built-in devices and may be external devices.

Figure 3:
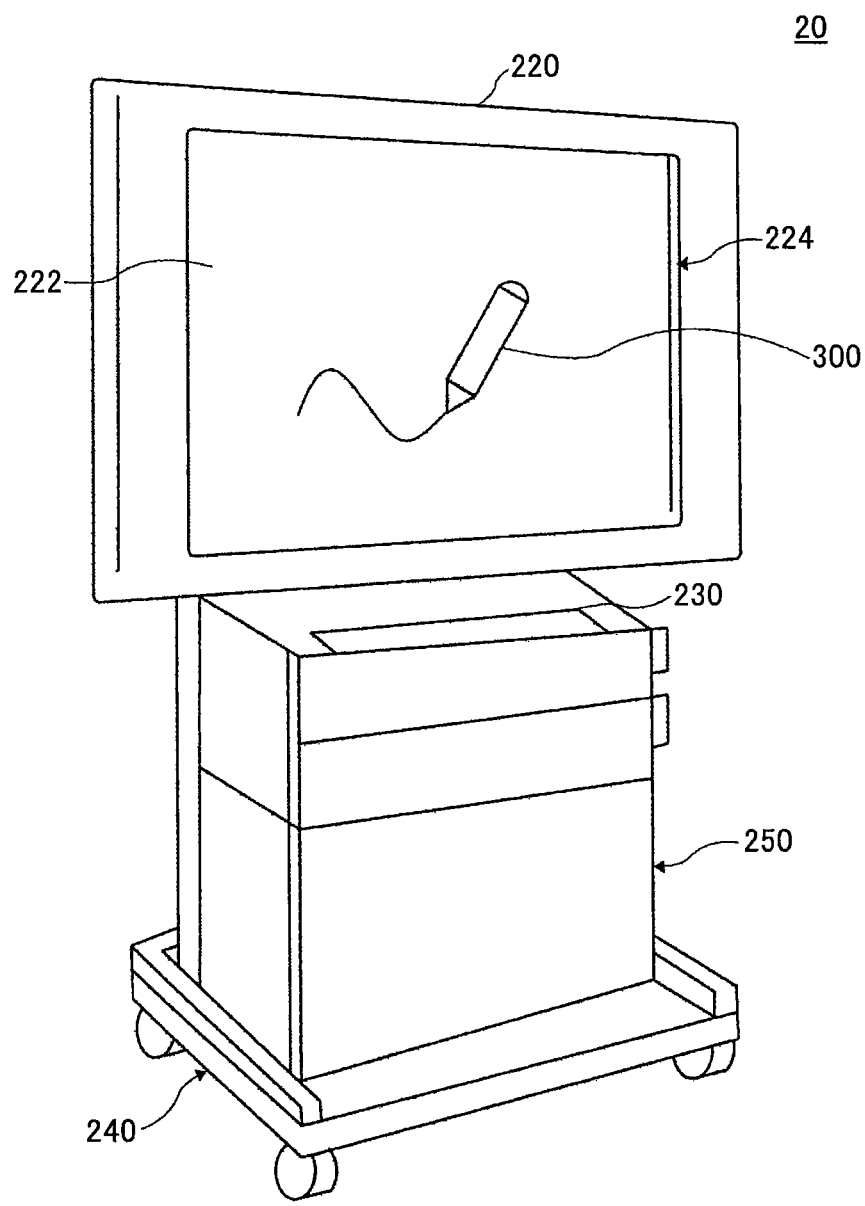
FIG. 3 is an external view illustrating an example of an interactive whiteboard according to the present embodiment.

FIG. 3 is an external view of the IWB 20 according to the present embodiment.

As illustrated in FIG. 3, the IWB 20 includes a display device 220, a stand 240 and a device storage part 250. The display device 220 includes a flat panel such as a liquid crystal display (LCD) or a plasma display panel (PDP), and a display surface 222 for displaying an image and a touch panel 224 are arranged in front of a casing of the display device 220.

In an input device 300, a signal transmission device is arranged. In a case of bringing a nib of the input device 300 into contact with the display surface 222, the signal transmission device sends a writing detection signal (contact detection signal) as a wireless signal. At a timing that the writing detection signal sent by the input device 300 is received on the side of the IWB 20, the display device 220 displays a character, a figure or the like written at a coordinate position detected by the touch panel 224.

Moreover, in a case of bringing another end of the input device 300 into contact with the display surface 222, the signal transmission device sends an erasing detection signal (contact detection signal) as a wireless signal. At a timing that the erasing detection signal sent by the input device 300 is received on the side of the IWB 20, the display device 220 erases a character, a figure or the like written at a coordinate position detected by the touch panel 224 from the display surface.

The device storage part 250 stores, for example, various devices such as a main body of the IWB 20. Moreover, on an upper face of the device storage part 250 is installed a keyboard 230 with which an input operation is performed.

Meanwhile, the management system 50 has the same external appearance as that of a generic server computer, and a description of the external appearance will be omitted.

Figure 4A:
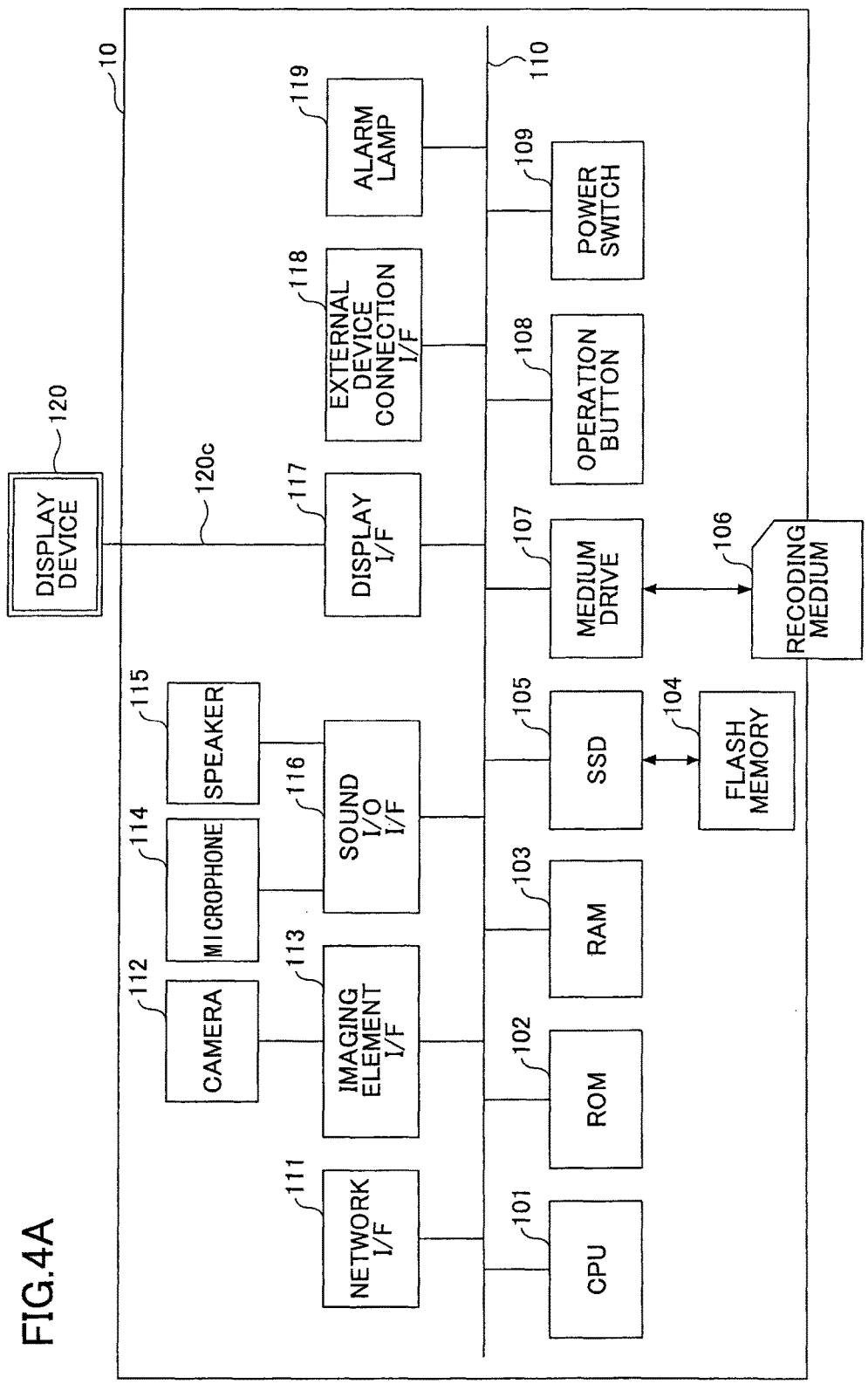

FIG. 4A is a hardware configuration diagram of a speech terminal 10 according to the present embodiment. As illustrated in FIG. 4A, the speech terminal 10 includes a central processing unit (CPU) 101 that controls an overall operation of the speech terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as programs for various types of terminals, image data and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation button 108 operated in a case of selecting a destination, the power switch 109 for turning ON/OFF the power of the speech terminal 10, and a network interface (I/F) 111 for performing data communication using the communication network 2.

In addition, the speech terminal 10 includes the built-in camera 112, which captures an image of a subject and obtains image data under control of the CPU 101; an imaging element I/F 113 that controls driving of the camera 112; the built-in microphone 114, which receives a sound input; the built-in speaker 115, which outputs sound; a sound input/output I/F 116 that processes inputting/outputting of a sound signal between the microphone 114 and the speaker 115 under control of the CPU 101; a display I/F 117 that communicates image data to an external display device 120 under control of the CPU 101; the external device connection I/F 118 for connecting various external devices; the alarm lamp 119, which indicates an abnormality of various functions of the speech terminal 10; and a bus line 110 such as an address bus or a data bus for electrically connecting the above-described elements as illustrated in FIG. 4A.

The display device 120 includes a liquid crystal display device (LCD), an organic electroluminescence (EL) display device, or the like, and displays an image of a subject, an icon for operation, or the like. In addition, the display device 120 is coupled to the display I/F 117 by the cable 120c. The cable 120c may be an analog red green blue (RGB) (video graphic array (VGA)) signal cable, a component video cable, a high-definition multimedia interface (HDMI(trademark registered)) signal cable, or a digital video interactive (DVI) signal cable.

The camera 112 includes a lens and a solid-state imaging element that converts light into electric charges to eletronize an image (video) of a subject. As the solid-state imaging element, for example, a complementary metal-oxide-semiconductor (CMOS) or a charge-coupled device (CCD) is used.

The external device connection I/F 118 is capable of connecting external devices such as an external camera, an external microphone and an external speaker, respectively, by using a Universal Serial Bus (USB) cable or the like, which is inserted into the connection port 1132 of the casing 1100. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Meanwhile, the recording medium 106 is configured to be removable from the speech terminal 10. In addition, a non-volatile memory that reads or writes data under control of the CPU 101 is not limited to the flash memory 104, and an electrically erasable and programmable read-only memory (EEPROM) may be used.

Meanwhile, the display device 120 may be built-in in the main body of the speech terminal 10. Moreover, in each of the various types of communication terminals, a hardware configuration depending on its function, which is not shown in FIGS. 4A and 4B, may be arranged. Furthermore, a part of the hardware configuration shown in FIGS. 4A and 4B may not be arranged.

Subsequently, by using FIG. 4B, difference between a hardware configurations of the IWB 20 and of the speech terminal 10 will be explained. FIG. 4B is the hardware configuration diagram illustrating the IWB 30 according to the present embodiment. Differently from the speech terminal 10, the IWB 20 according to the present embodiment does not include a camera 112, an imaging element I/F 113, a microphone 114, a speaker 115 and a sound input/output I/F 116.

On the other hand, the IWB 20 is provided with a touch panel 224, an I/F 121 for the touch panel 224 and a signal reception device 225 for receiving a contact detection signal sent from the input device 300 and outputting the contact detection signal to the touch panel 224. A touch panel driver, which is a control circuit for the touch panel 224, recognizes that an input operation is performed based on the contact detection signal sent from the input device 300, and outputs image information corresponding to the input operation by the input device 300. The built-in display device 220 in the IWB 20 outputs respective images superposed based on image information output by the touch panel driver at a timing of an input operation or image information sent from other IWB 20 via the communication network 2. Moreover, the IWB 20 is provided with the keyboard 230. Based on an operation for the keyboard 230, an operation input can be received.

Figure 5:
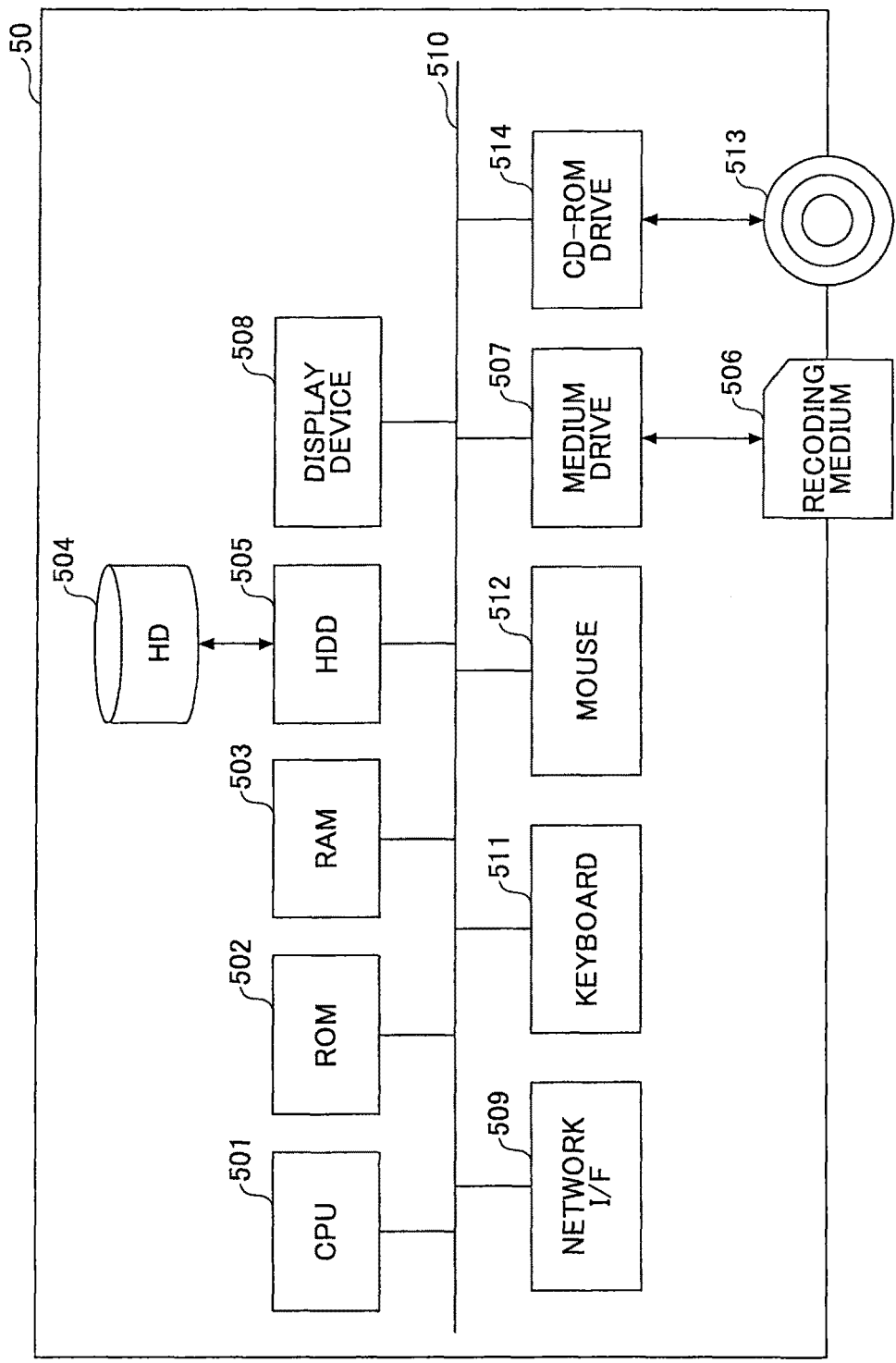
FIG. 5 is a hardware configuration diagram illustrating an example of a management system according to the present embodiment.

FIG. 5 is a hardware configuration diagram of the management system 50 according to the present embodiment. The management system 50 includes a CPU 501 that controls the overall operation of the management system 50; a ROM 502 that stores a program used for driving the CPU 501, such as an IPL; a RAM 503 used as a work area for the CPU 501; an HD 504 that stores various types of data, such as a program for the management system 50; a hard disk drive (HDD) 505 that controls reading/writing of various types of data from/to the HD 504 under control of the CPU 501; a medium drive 507 that controls reading/writing (storage) of data from/to a recording medium 506 such as a flash memory; a display device 508 that displays various types of information such as a cursor, a menu, a window, characters or an image; a network I/F 509 for communicating data using the communication network 2; a keyboard 511 including a plurality of keys for entering characters, numerals, various instructions or the like; a mouse 512 that performs selection and execution of various instructions, selection of a processing target, movement of a cursor or the like; a compact disc read-only memory (CD-ROM) drive 514 that controls reading/writing of various types of data from/to a CD-ROM 513 serving as an example of a removable recording medium; and a bus line 510 such as an address bus and a data bus for electrically connecting the above-described elements as illustrated in FIG. 5.

Functional Configuration of the Embodiment

Next, the functional configuration of the embodiment will be described. FIG. 6 is a functional block diagram of the speech terminal 10, the IWB 20 and the management system 50 of the communication system 1 according to the present embodiment. In FIG. 6, the terminal 10, the IWB 20 and the management system 50 are connected to be capable of communicating data via the communication network 2.

<Functional Configuration of Communication Terminal>

The speech terminal 10 as a communication terminal includes a transmission/reception unit 11, an operation input reception unit 12, a display control unit 13 and a storage/readout unit 19. On the other hand, the IWB as a communication terminal includes a transmission/reception unit 21, an operation input reception unit 22, a display control unit 23 and a storage/readout unit 29, in the same way as the speech terminal 10. These elements are functions that are realized by operating any of the elements illustrated in FIG. 4 (FIG. 4A or FIG. 4B) in response to a command from the CPU 101 in accordance with a program loaded from the flash memory 104 onto the RAM 103. Moreover, the speech terminal 10 or the IWB 20 has a storage unit (1000, 2000) configured with the ROM 102, the RAM 103 and the flash memory 104.

(Respective Functional Configurations of Communication Terminal)

Next, using FIG. 6, respective functional configurations of the speech terminal 10 and the IWB 20 will be described in detail. Meanwhile, in the following description of the respective functional configurations of the speech terminal 10 and the IWB 20, among the respective elements illustrated in FIG. 4A or FIG. 4B, relationships with main elements for realizing the respective functional configurations of the speech terminal 10 and the IWB 20 will also be described.

The transmission/reception units (11, 21) of the speech terminal 10 and the IWB 20 are enabled by commands from the CPU 101 and via the network I/F 111, and perform transmission/reception of various types of data (or information) to/from the speech terminal of the other side, each apparatus, a system or the like via the communication network 2.

The operation input reception unit 12 is enabled by a command from the CPU 101, the operation button (108a, 108b, 108c, 108d, 108e) and the power switch 109, and receives various inputs from a user or a various types of selections by the user.

The operation input reception unit 22 is enabled by a command from the CPU 101, the touch panel 224, the power switch 109 and the keyboard 230, and receives various inputs from the user or a various types of selections by the user.

The display control unit (13, 23) is enabled by a command from the CPU 101 and the display I/F 117, and controls transmission of image data sent from a communication terminal of the other side to the display device 120. Meanwhile, in a case of the IWB 20, the image data to be sent to the display device 220 may be image information sent from an IWB 20 of the other side or may be image information based on an operation for the input device 300 of the own terminal.

The storage/readout unit (19, 29) is enabled by a command from the CPU 101, and stores various types of data into the storage unit (1000, 2000) and extracts various types of data from the storage unit (1000, 2000).

<Functional Configuration of Management System>

The management system 50 includes a transmission/reception unit 51, an authentication unit 52, a management unit 53, a creation unit 54, a cooperation management unit 57, a session control unit 58 and a storage/readout unit 59. These elements are functions or means that are enabled by operating any of the elements illustrated in FIG. 5 in response to a command from the CPU 501 in accordance with a program for the management system 50 loaded from the HD 504 onto the RAM 503. In addition, the management system 50 includes a storage unit 5000 configured with the HD 504. The storage unit 5000 includes an authentication management DB 5001 made of an authentication management table which will be described later, a terminal management DB 5002 made of a terminal management table, a cooperation management DB 5003 made of a cooperation management table and an image information management DB 5004 made of an image information management table.

(Terminal Authentication Management Table)

FIG. 7A is a conceptual diagram illustrating the terminal authentication management table. In the terminal authentication management table, a password is managed in association with a communication ID for identifying a speech terminal 10 of communication destination or an IWB 20. Meanwhile, the communication ID here may be an ID stored in a communication terminal in advance or may be an ID which a user inputs to the communication terminal. In a case where the communication ID is input to the communication terminal, the communication ID sent from the communication terminal upon the login request is managed in the management system 50 in association with the communication terminal of the login request source, and thereby the communication terminal can be identified based on the communication ID. Meanwhile, the explanation continues assuming that communication IDs of the speech terminals (10a, 10b, 10c) are "01a, 01b, 01c", respectively, and communication IDs of the IWBs (20a, 20b, 20c) are "02a, 02b, 02c", respectively.

(Terminal Management Table)

FIG. 7B is a conceptual diagram illustrating the terminal management table. In the terminal management table, a terminal name and an operation state of each communication terminal are managed in association with the communication ID, for communication ID of each of various types of communication terminals such as the speech terminal 10 or the IWB 20. Meanwhile, the operation state shows "online", which is a state where the communication terminal indicated by the communication ID is coupled to the management system 50, or "offline", which is a state where the communication terminal is not coupled to the management system 50. Furthermore, the "online" has a state where communication with the communication terminal indicated by the communication ID is possible ("communication OK") and a state where the communication terminal indicated by the communication ID is communicating ("communicating").

(Cooperation Management Table)

FIG. 7C is a conceptual diagram illustrating the cooperation management table. In the cooperation management table, for the communication ID of each of the speech terminals 10, the communication ID of the IWB 20 operated in cooperation with the speech terminal 10 is managed in association with the communication ID of the speech terminal 10. Meanwhile, in a case of operating other communication terminals such as a projector or a digital signage device in cooperation with the speech terminal 10 or the IWB 20, in the cooperation management table, a communication ID of the other communication terminals may be managed in association with the communication ID of the speech terminal 10 and the communication ID of the IWB 20.

(Image Information Management Table)

FIG. 7D is a conceptual diagram illustrating the image information management table. The image information management table is created for each session ID of a session between IWBs 20. That is, each time a session between IWBs 20 is established, data are appended to the image information management table. In the image information management table, for each of divided sections having sheet numbers, numbers of images, image information, a communication ID of an IWB 20 which is a transmission source of the image information, and a time when the image information is created are managed in association with each other. The image information includes stroke information indicating a stroke such as a "line" or a "circle", text information indicating a text, information "delete" indicating an image to be deleted or the like. These pieces of image information may include coordinate information indicating a position where an image is output or deleted, information indicating a size, color or a font of an image or the like. Moreover, the image information may include not only the above-described image information of the image to be added or the image information of the image to be deleted, but also image information of an image to be corrected. In the present embodiment, text is an example of an image, and includes a character, a symbol and the like. The above-described pieces of image information are stored in a field of image information in the image information management table in an order of image numbers until the service ends (EOS: End of Service). Moreover, according to the present embodiment, the IWB 20 can output different images on respective work spaces which can be switched by a tab displayed on the display device 220. The above-described sheet numbers are numbers for identifying the work spaces. Meanwhile, the "sheet" may be replaced by an arbitrary term indicating a region where an image is drawn, such as a worksheet, a space or a workspace.

(Respective Functional Configurations of Management System)

Next, functional configuration of the management system 50 will be described in detail. Note that, in the following description of functional configuration of the management system 50, among elements illustrated in FIG. 5, relationships with main elements for realizing the functional configuration of the management system 50 will also be described.

The transmission/reception unit 51 is executed by a command from the CPU 501 and by the network I/F 509, and performs transmission/reception of various types of data (or information) to/from the respective communication terminals, an apparatus or a system via the communication network 2.

The authentication unit 52 is operated by a command from the CPU 501, and performs authentication of a communication terminal by searching the authentication management table (See FIG. 7A) with a communication ID and a password received via the transmission/reception unit 51 as search keys and determining whether the same pair of a communication ID and a password is managed in the authentication management table.

The management unit 53 is operated by a command from the CPU 501. The management unit 53 stores and manages, in the terminal management table (see FIG. 7B), for each communication ID and terminal name of the speech terminal 10 and the IWB 20, an operation state of the speech terminal 10 or the IWB 20 in association with one another.

The creation unit 54 is operated by a command from the CPU 501, and creates a document displayable on a browser. The document may be, for example, described in the HyperText Markup Language (HTML).

The cooperation management unit 57 is operated by a command from the CPU 501, and causes operations between communication terminals to cooperate.

The session control unit 58 is operated by a command from the CPU 501, and performs a control for a session of sending content data between communication terminals. Meanwhile, here a session between speech terminals 10 will be denoted as a session sed1, and a session between IWBs 20 will be denoted as a session sed2. Moreover, the above-described control includes a control for establishing a session, a control for causing a speech terminal 10 to participate the established session, a control for disconnecting the session or the like.

The storage/readout unit 59 is operated by a command from the CPU 501 and the HDD 505, or operated by a command from the CPU 501. The storage/readout unit 59 performs processing to store various types of data in the storage unit 5000 or extract various types of data stored in the storage unit 5000.

Process or Operation of Embodiment

Next, a process or an operation of the speech terminal 10, the IWB 20, and the management system 50 configuring the communication system 1 according to the present embodiment will be described. Moreover, FIG. 8 is a sequence diagram illustrating a process until a session between the speech terminal 10 or the IWB 20 and the management system 50 is established.

Figure 8:
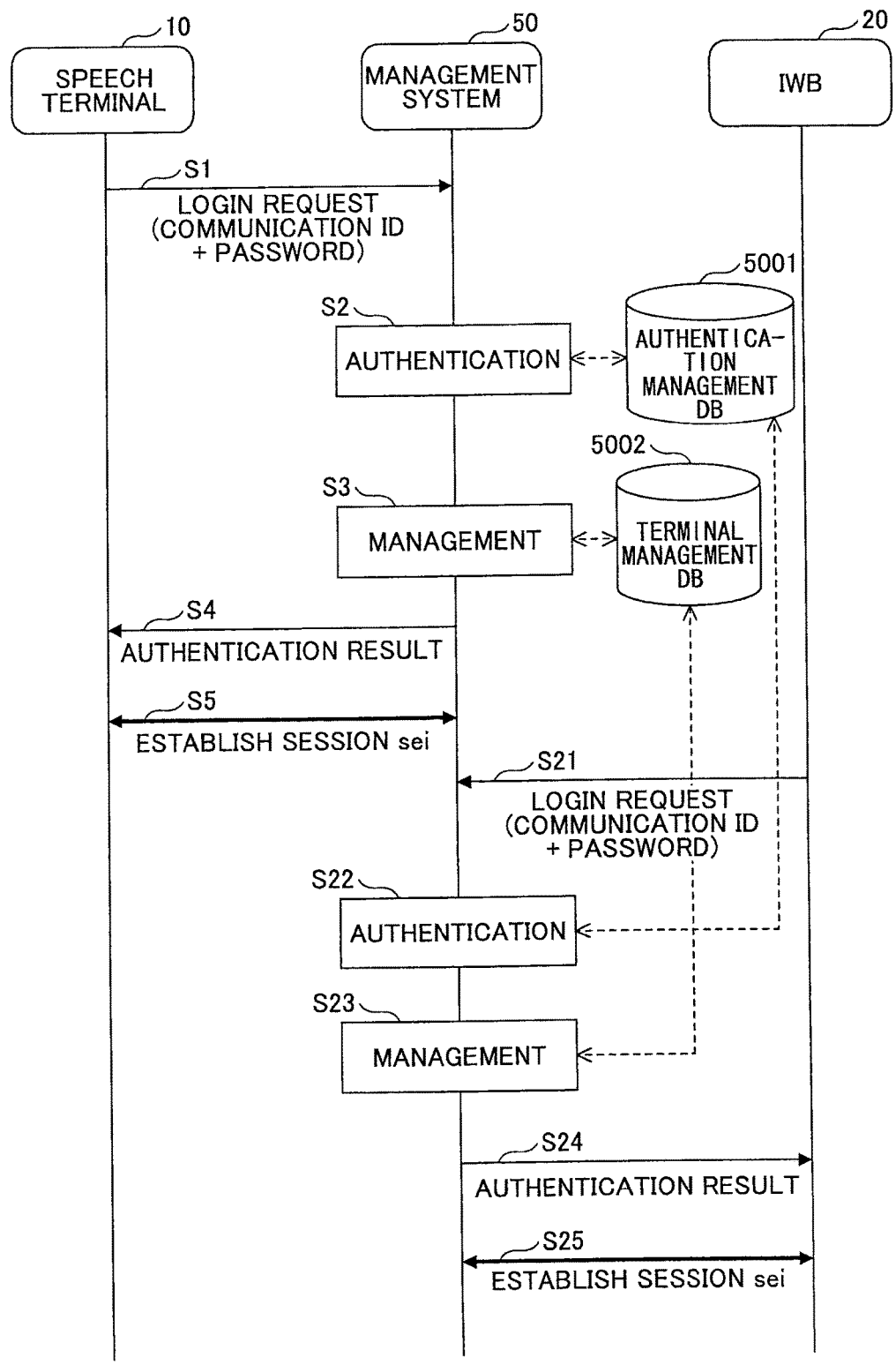
FIG. 8 is a sequence diagram illustrating an example of a process until a session between the speech terminal or the interactive whiteboard and the management system is established according to the present embodiment.

As shown in FIG. 8, the speech terminal 10 performs a login request to the management system 50 by using the transmission/reception unit 11 (step S1). The login request includes a communication ID for identifying the speech terminal 10 of the login request source and a password. Accordingly, the transmission/reception unit 51 of the management system 50 receives the login request with the communication ID and the password.

Next, the authentication unit 52 performs authentication of the speech terminal 10 of the login request source by determining whether the same pair of the communication ID and the password received by the transmission/reception unit 51 is managed in the authentication management table (see FIG. 7A) (step S2). Then, in a case where it is determined to be a valid speech terminal by the authentication, the management unit 53 manages an operation state of "ONLINE" for a corresponding communication ID in the terminal management table (see FIG. 7B) (step S3).

Next, the transmission/reception unit 51 sends an authentication result to the speech terminal 10 of the login request source (step S4). Accordingly, the transmission/reception unit 11 receives the authentication result. Then, in the case where it is determined to be a valid speech terminal in above-described step S2, a session "sei" is established between the speech terminal 10 of the login request source and the management system 50 (step S5). Meanwhile, in order to distinguish from each of the session "sed1" between speech terminals 10 and the session "sed2" between IWBs, a session between a speech terminal 10 or an IWB 20 and the management system 50 will be denoted as "sei".

In the same ways as above, as shown in FIG. 8, the IWB 20 performs a login request to the management system 50 by using the transmission/reception unit 21 (step S21). The login request includes a communication ID for identifying the IWB 20 of the login request source and a password. Accordingly, the transmission/reception unit 51 of the management system 50 receives the login request with the communication ID and the password.

Next, the authentication unit 52 performs authentication of the IWB 20 of the login request source by determining whether the same pair of the communication ID and the password received by the transmission/reception unit 51 is managed in the authentication management table (see FIG. 7A) (step S22). Then, in a case where it is determined to be a valid IWB by the authentication, the management unit 53 manages an operation state of "ONLINE (communication ok)" for a corresponding communication ID in the terminal management table (see FIG. 7B) (step S23).

Next, the transmission/reception unit 51 sends an authentication result to the IWB 20 of the login request source (step S24). Accordingly, the transmission/reception unit 21 receives the authentication result. Then, in the case where it is determined to be a valid IWB in above-described step S22, a session "sei" is established between the IWB 20 of the login request source and the management system 50 (step S25).

Figure 9:
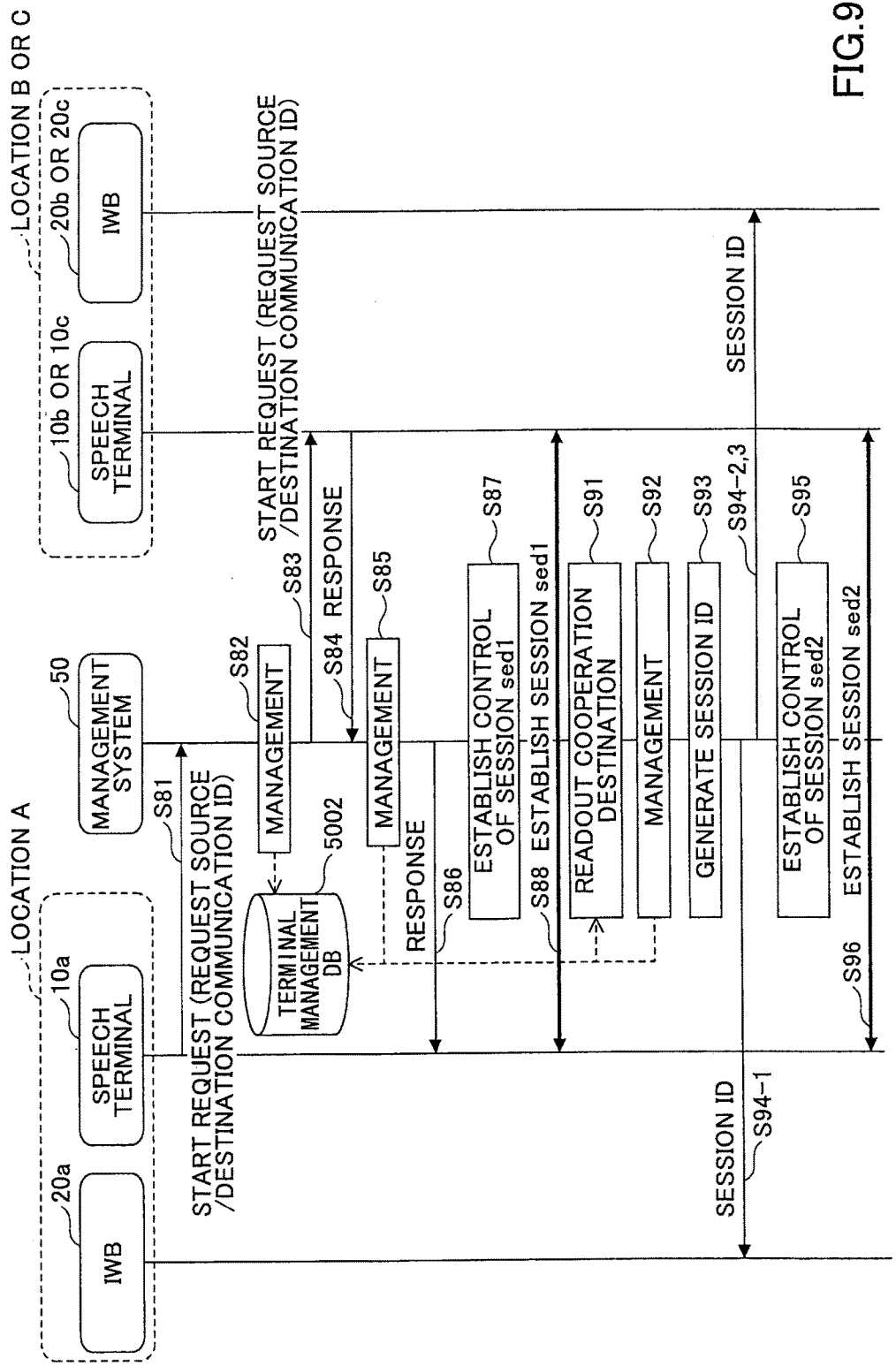
FIG. 9 is a sequence diagram illustrating an example of a process of establishing a session between the speech terminals or between the interactive whiteboards according to the present embodiment.

Next, with reference to FIG. 9, a process for establishing a session for sending content data between speech terminals 10 or between IWBs 20 will be described. Meanwhile, FIG. 9 is a sequence diagram illustrating a process of establishing a session between the speech terminals 10 or between the IWBs 20. The session includes a session "sed1" for sending sound data and image data between the speech terminals 10 and a session "sed2" for sending image information between the IWBs 20.

As shown in FIG. 9, the speech terminal 10, in response to an operation by a user for the operation button 108, by using the transmission/reception unit 11, sends a communication start request to the management system 50 (step S81). The communication start request includes a communication ID of the speech terminal 10 of a communication start request source and a communication ID of a destination speech terminal 10. In the following description, the communication start request source is assumed to be a speech terminal 10a, and the destination is assumed to be speech terminals (10b, 10c).

The transmission/reception unit 51 of the management system 50 receives the communication start request. Then, the management unit 53 of the management system 50 manages an operation state of "ONLINE (communicating)" for the communication ID of the speech terminal 10a of the communication start request source in the terminal management table (see FIG. 7B) (step S82).

Next, the transmission/reception unit 51 of the management system 50 sends a communication start request to the destination speech terminals (10b, 10c) (step S83). The communication start request includes the communication ID of the speech terminal 10a of the communication start request source and the communication ID of the destination speech terminal (10b or 10c). Accordingly, the destination speech terminals (10b, 10c) receive the communication start request.

Contrary to this, the speech terminals (10b, 10c), in response to a user's operation for the operation button 108, by using the transmission/reception unit 11, send information indicating response propriety to the management system 50 (step S84). The information indicating response propriety shows that a response is performed in a case where a user's input for allowing speech is received on the side of the destination speech terminals (10b, 10c), and that a response is not performed in a case where a user's input for rejecting speech is received on the side of the destination speech terminals (10b, 10c). In the following, the description continues in the case where the speech terminals (10b, 10c) send information showing that the response is performed to the management system 50.

Accordingly, the transmission/reception unit 51 of the management system 50 receives the information showing that the response is performed. Next, the management unit 53 of the management system 50 manages an operation state of "ONLINE (communicating)" for the communication IDs of the destination speech terminals (10b, 10c) in the terminal management table (see FIG. 73) (step S85).

Next, the transmission/reception unit 51 of the management system 50 sends to the speech terminal 10a of the start request source the information showing that the response is performed which is sent from the destination speech terminals (10b, 10c) in above-described step S84 (step S86). Accordingly, the speech terminal 10a receives the information showing that the response is performed by using the transmission/reception unit 11.

Next, the session control unit 58 of the management system 50 controls establishing the session "sed1" for sending image data and sound data via the communication network 2 among the speech terminals (10a, 10b, 10c). A method for establishing the session "sed1" is not limited, but includes, for example, a method for sending connection information for coupling to a relay apparatus to the speech terminals (10a, 10b, 10c) by the transmission/reception unit 51 based on control by the session control unit 58, in a case where the relay apparatus for relaying image data and sound data is arranged on the communication network 2. Moreover, the transmission/reception unit 51 may send to the relay apparatus a request for starting relaying image data and sound data among the speech terminals (10a, 10b, 10c) based on the control by the session control unit 58. Moreover, as the method for establishing the session "sed1", a known method, such as the method described in FIG. 25 of Japanese Unexamined Patent Application Publication No. 2012-50063 may be employed.

Based on the above-described control method, the session "sed1" is established (step S88). Accordingly, the speech terminals (10a, 10b, 10c) become able to send/receive image data and sound data to/from the speech terminals (10c, 10b, 10a) which is a communications partner.

Next, the cooperation management unit 57 searches the cooperation management table (see FIG. 7C) with the communication ID "01a" of the speech terminal 10a of the communication start request source and the communication IDs "01b, 01c" of the destination speech terminals (10b, 10c) as search keys, respectively, and reads out communication IDs "02a, 02b, 02c" of corresponding IWBs 20 (cooperation terminals) (step S91).

Next, the management unit 53 associates an operation state of "ONLINE (communicating)" with the communication IDs "02a, 02b, 02c" read out in step S91 and manages the communication IDs in the terminal management table (see FIG. 7B) (step S92).

Next, the session management unit 58 generates a session ID for the session "sed2" for sending image information among the IWBs (20a, 20b, 20c) (step S93). The transmission/reception unit 51 of the management system 50 sends the session ID generated in step S93 to the IWBs (20a, 20b, 20c) (steps S94-1, 2, 3).

Moreover, the session management unit 58 of the management system 50 controls establishing the session "sed2" for sending image information among the IWBs (20a, 20b, 20c) via the communication network 2 (step S95). A method for establishing the session "sed2" is not limited, but may include, for example, a method for sending destination information of a communication partner (IWBs (20b, 20c)) to the IWB 29a by the transmission/reception unit 51 based on the control by the session control unit 58, and thereby causing the IWB 20 to perform a call request to the IWBs (20b, 20c).

Based on the above-described control method, the session "sed2" is established (step S96). Accordingly, the IWBs (20a, 20b, 20c) send/receive image information to/from the IWBs (20c, 20b, 20a) which is a communication partner, thereby an image can be shared.

Next, with reference to FIGS. 10A to 10C, a process of sending image information among the IWBs 20 in the established session "sed" will be described. Each of FIGS. 10A to 10C is a sequence diagram illustrating a process of sending image information among the IWBs 20.

First, with reference to FIG. 10A, a process of sending image information by the IWB 20a will be described. In a case where a user of the IWB 20a brings a nib or another end of the input device 300 into contact with the touch panel 224, the input device 300 sends a contact detection signal. In a case where the signal reception device 225 receives the contact detection signal, the touch panel 224 as the operation input reception unit 22 receives an operation input by the input device 300 (step S101).

Next, the display control unit 23 outputs image information depending on the above-described operation based on a kind of the contact detection signal (writing detection signal or erasing detection signal) and coordinate information detected by the touch panel 224. Accordingly, the display control unit 23 causes the display device 220 to output an image based on the image information overlaying on the image output by the previous process (step S102).

On the other hand, the transmission/reception unit 21 sends the above-described image information, a sheet number of a sheet on which the image is drawn or the like, time at which the image information is generated, the communication ID of the own terminal (IWB 20a) and the session ID of the session "sed2" among the IWBs (20a, 20b, 20c) to the IWBs (20b, 20c) which are communications partners in the session "sed2" (steps S103-1, S103-2).

Furthermore, the transmission/reception unit 21 sends the image information, the sheet number of the sheet on which the image is drawn or the like, time at which the image information is generated, the communication ID of the own terminal (IWB 20a) and the session ID of the session "sed2" among the IWBs (20a, 20b, 20c), which are the same as those sent to the IWBs (20b, 20c), to the management system 5 which is a communications partner in the session "sei" (step S104).

In a case where each of the transmission/reception unit 21 of the respective IWBs (20b, 20c) receives the image information set from the IWB 20a, each display control unit 23 performs control of outputting an image based on the image information overlaying on the image output by the previous process (steps S105-1, S105-2). Accordingly, each of the IWBs (20b, 20c) can output the same image as the image output on the IWB 20a on the corresponding display device 220.

In a case where the transmission/reception unit 51 of the management system 50 receives information from the IWB 20a, the storage/readout unit 59 additionally stores the image information, the communication ID and the time sent from the IWB 20a in association with one another in a section of the sheet number sent from the IWB 20a in the image information management table (see FIG. 7D) prepared for the session "sed2" among the IWBs (201, 20b, 20c).

FIGS. 10B and 10C illustrate processes of sending image information among the IWBs 20, wherein the IWB (20b or 20c) is a transmission source of the image information. Since these processes (steps S111 to S116 or steps S121 to S125) are the same as those illustrated in FIG. 10A (steps S101 to S106) except that roles of the respective IWBs 20 are changed, detailed description will be omitted.

In this way, the display control unit 23 of each of the IWBs 20 performs a process of overlaying and outputting an image based on the image information each time image information is generated at a timing of receiving a writing detection signal at the own terminal (IWB 20) or each time image information ("Line", "Circle" or "Text") is sent from each of the IWBs 20 which are communications partners. Moreover, the display control unit 23 performs a process of removing an image corresponding to image information "Delete" among the superimposed output images each time image information is generated at a timing of receiving an erasing detection signal at the own terminal (IWB 20) or each time image information "Delete", indicating erasure of images, is sent from any of the IWBs 20 which are communications partners.

That is, in the process of communication by the session "sed2", a part of the image shared among the IWBs (20a, 20b, 20c) is added or removed.

Moreover, each time any of the IWBs 20 sends image information in the session "sed2", the image information, communication ID, time and the like are added to the image information management table of the management system 50. Accordingly, in the management system 50, it is possible to manage each piece of image information based on operations in each of the IWBs 20.

Figure 11:
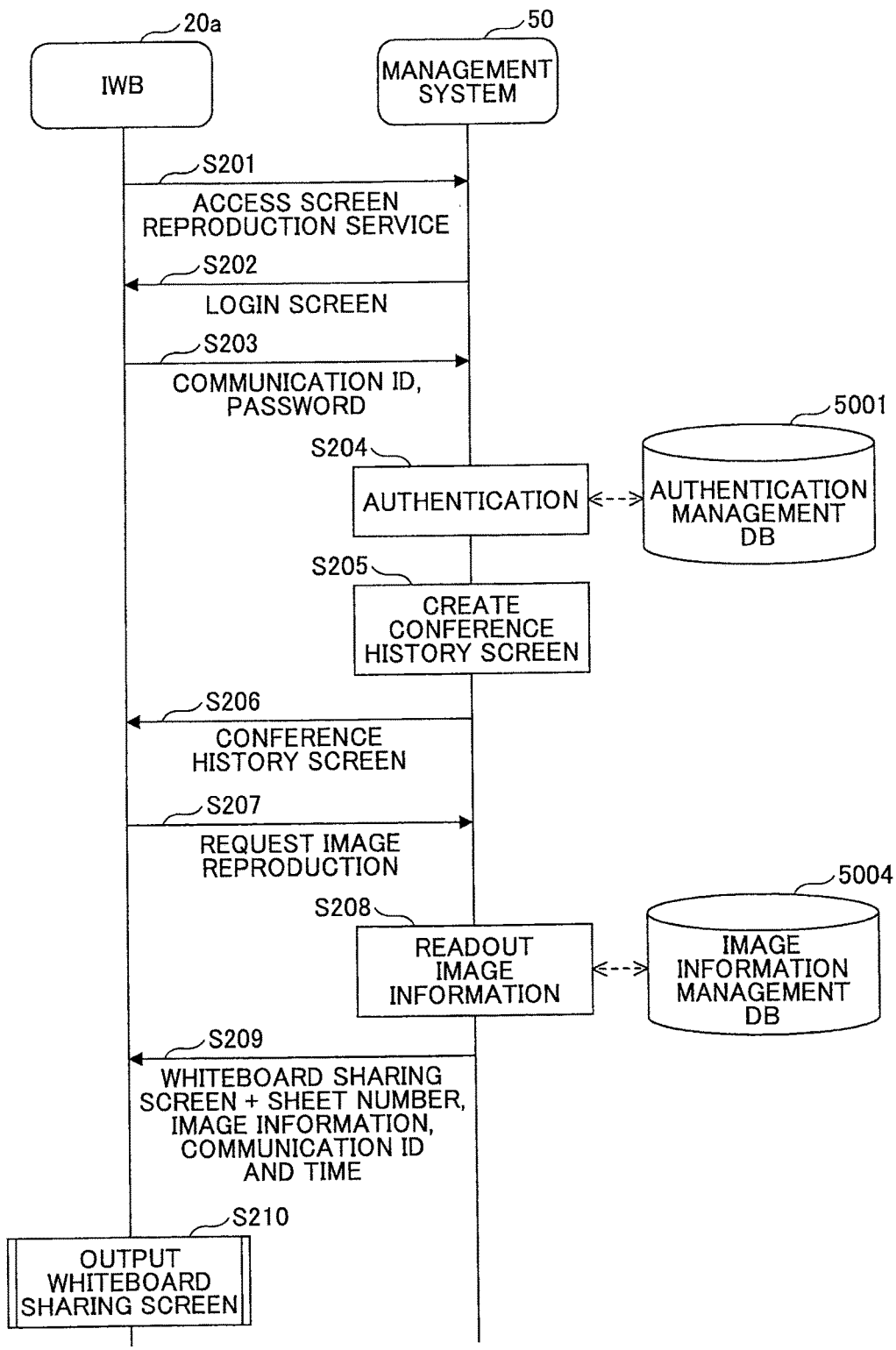
FIG. 11 is a sequence diagram illustrating an example of a process of reproducing an image according to the present embodiment.

Next, with reference to FIG. 11, a process of reproducing an image shared among the IWBs (20a, 20b, 20c) after the IWB 20a leaves the session "sed2" will be described. FIG. 11 is a sequence diagram illustrating a process of reproducing the image. In the following, the process of reproducing the image at the IWB 20a will be described, but the terminal that reproduces the image is not limited to the IWB 20a. For example, the image may be reproduced at another IWB 20, or another communication terminal such as a PC (Personal Computer) which realizes at least a part of the function of the transmission/reception unit 21, the display control unit 23 or the like according to a concerted operation by application and hardware. In this case, the IWB 20a in the following description may be replaced by the other IWB 20 or the other communication terminal.

The management system 50 according to the present embodiment has a Web server function. The IWB 20 can reproduce an image by using an image reproduction service provided by a Web server function of the management system 50.

First, the transmission/reception unit 21 of the IWB 20a, in response to an operation input by a user, accesses the image reproduction service of the management system 50 (step S201). In response to the access, the transmission/reception unit 51 of the management system 50 sends to the IWB 20a an HTML file for a login screen to the image reproduction service (step S202). FIG. 13A is a diagram illustrating an example of the login screen.

The transmission/reception unit 21 of the IWB 20a, in response to an operation by the user, sends to the management system 50 a communication ID and a password input to the login screen (step S203).

The authentication unit 52 of the management system 50 performs authentication of a login request source by determining whether the same pair as a pair of the communication ID and the password sent from the IWB 20a is managed in the authentication management table (see FIG. 7A) (step S204).

In a case where it is determined to be a valid terminal by the above-described authentication, the creation unit 54 searches the image information management DB 5004 with the communication ID of the IWB 20a which is login request source as a search key, and extracts an image information management table (see FIG. 7D) including the communication ID. Furthermore, the creation unit 54, based on information recorded in the respective extracted image information management tables, identifies participation date and time, participation time, a number of locations (number of participating terminals) regarding each of the sessions "sed2" in which the IWB 20a participates. Then, the creation unit 54 creates an HTML file of a conference history screen on which the respective identified participation date and time, the respective participation time, the respective number of locations and a button for receiving a request for reproducing an image generated at each of the sessions "sed2" (step S205). FIG. 13B is a diagram illustrating an example of a conference history screen.

The transmission/reception unit of the management system 50 sends the HTML file of the conference history screen to the IWB 20a (step S206).

In a case of receiving a selection of a button (any of whiteboard information reference buttons in the conference history screen in FIG. 13B) for receiving a request for reproducing an image generated at any of the sessions "sed2" by the operation input reception unit 22, the transmission/reception unit 21 sends a request for reproducing an image generated at the selected session "sed2" to the management system 50 (step S207).

In a case where a request for whiteboard information is received by the transmission/reception unit 51 of the management system 50, the creation unit 54 reads out image information, communication ID and time related to all images for each sheet number from the image information management table (see FIG. 7D) corresponding to the selected session "sed2" (step S208). Moreover, as a part of the process in step S208, the creation unit 54 creates an HTML file of a whiteboard sharing screen.

Subsequently, the transmission/reception unit 51 of the management system 50 sends the HTML file of the whiteboard sharing screen to the IWB 20a (step S209). As a part of the process in step S209, the transmission/reception unit 51 sends to the IWB 20a the image information, the communication ID and the time related to all images for each sheet number from the image information management table in step S208 in association with one another.

Figure 12:
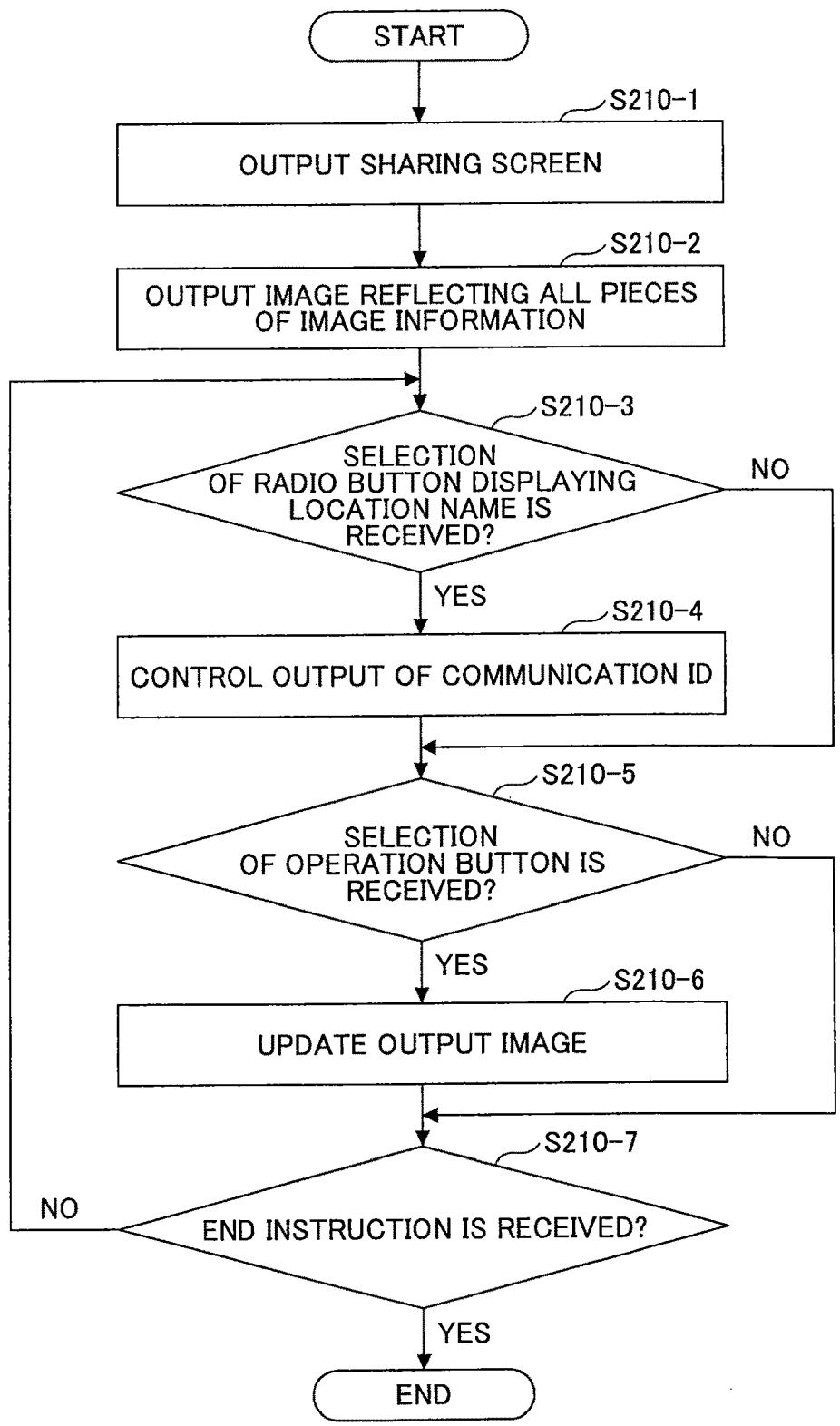
FIG. 12 is a flowchart illustrating an example of a process of controlling an output of a shared screen of the whiteboard according to the present embodiment.

In a case where the transmission/reception unit 21 of the IWB 20a receives the HTML file of the whiteboard sharing screen and respective pieces of information read from the image information management table, the display control unit 23 controls an output of the whiteboard sharing screen (step S210). With reference to FIG. 12, a process of controlling the output of the whiteboard sharing screen will be described. FIG. 12 is a flowchart illustrating the process of controlling the output of the whiteboard sharing screen.

First, the display control unit 23 outputs the whiteboard sharing screen sent from the management system 50 to the display device 220 (step S210-1). Next, the display control unit 23 outputs an image reflecting all pieces of image information related to a default sheet number (e.g. Sheet No. 1) among the pieces of image information sent from the management system 50 to the whiteboard sharing screen superimposedly. Meanwhile, the default sheet is not especially limited, but may be based on a setting by a user or may be a sheet displayed finally in the session "sed2". FIG. 14 is a diagram illustrating an example of the display image of the display device in step S210-2. According to the above-described process, an image of sheet No. 1 at the close of the conference is displayed on the whiteboard sharing screen.

Figure 15:
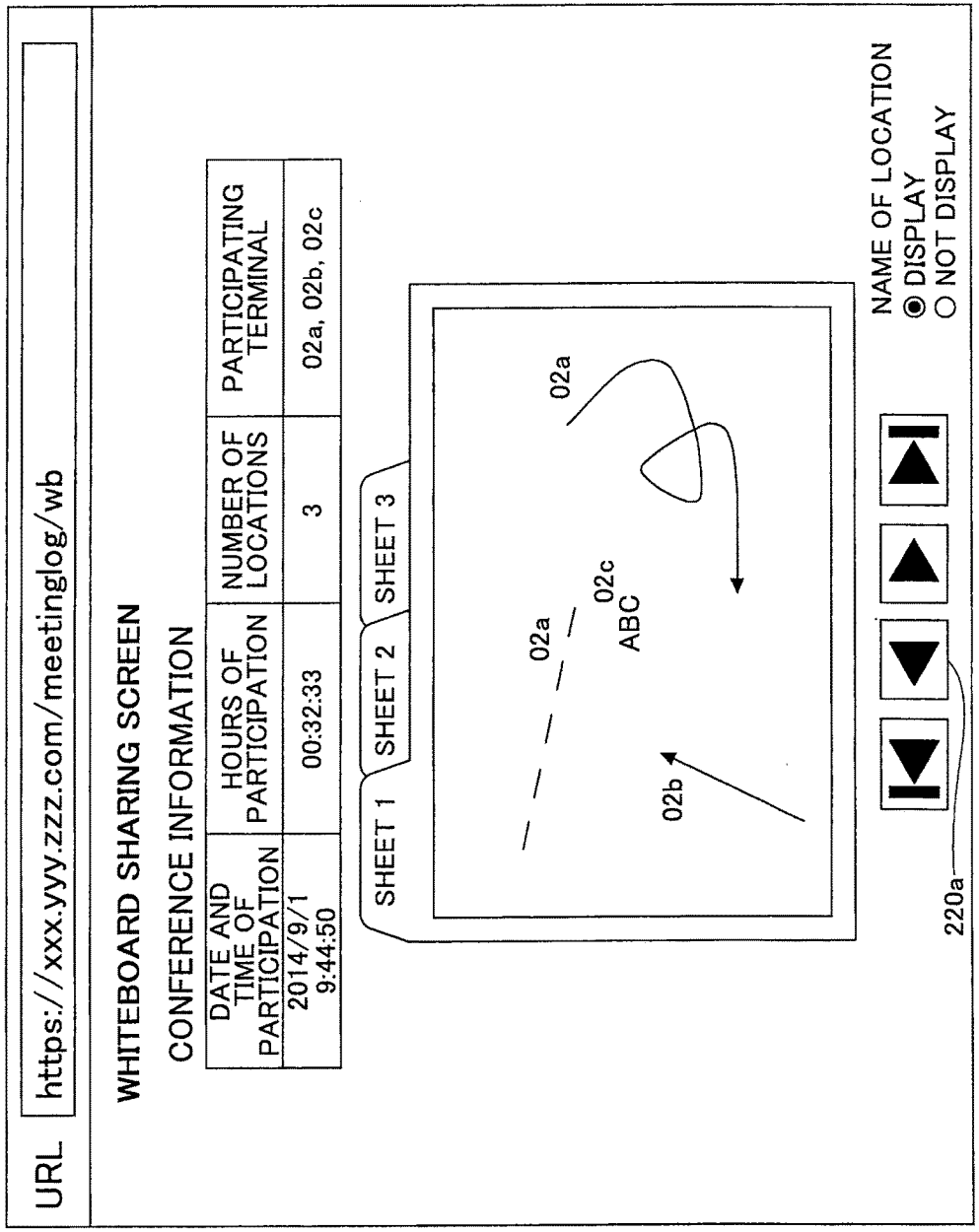
FIG. 15 is a view illustrating yet another example of the displayed image according to the present embodiment.

In a case where the operation input reception unit 22 receives a selection of a radio button indicating displaying a location name in the whiteboard sharing screen (step S210-3: YES), the display control unit 23 controls an output of a communication ID in the whiteboard sharing screen (step S210-4). Specifically, the display control unit 23 displays, adjacent to each image displayed in the whiteboard sharing screen, the communication ID of the IWB 20, which sends the image information related to the image. Meanwhile, since the management system 50 sends to the IWB 20a each piece of image information and a communication ID of an IWB 20, which is a transmission source of the image information in association with each other, the display control unit 23 of the IWB 20a can display, adjacent to each image, the communication ID of the IWB 20 which sends the image information related to the image, as described above. FIG. 15 is a diagram illustrating an example of the display image of the display device in step S210-4. By the image, a user of the IWB 20a can see at which IWB 20 each image is created.

In a case where the operation input reception unit 22 receives a selection of an operation button displayed in the whiteboard sharing screen (step S210-5: YES), the display control unit 23 updates an image to be output (step S210-6). For example, in the whiteboard sharing screen, shown in FIG. 15, in a case of receiving a selection of a backward reproduction button 220a among the operation buttons, the display control unit 23 outputs images superimposed without reflecting image information created finally among pieces of image information related to the image displayed in the whiteboard sharing screen. Meanwhile, since the management system 50 sends to the IWB 20a each piece of image information and a creation time of the image information in association with each other, the display control unit 23 of the IWB 20a can identify the image information created finally among the transmitted pieces of image information.

For example, in a case where the image information created finally is image information "delete" related to image erasing, the display control unit 23 outputs images superimposed without reflecting the image erasing based on the image information "delete" created finally. That is, it is possible to reproduce the image erased finally. FIG. 16 is a diagram illustrating an example of the display image of the display device in step S210-6.

The above-described process is repeatedly executed until the operation input reception unit 22 receives a stop instruction for output of the whiteboard sharing screen (step S210-7: YES). For example, in the whiteboard sharing screen in FIG. 16, in a case where the reproduction button 220b is selected among the operation buttons, the display image in FIG. 16 returns to the display image in FIG. 15. Moreover, in the whiteboard sharing screen in FIG. 15, in a case where a radio button indicating not displaying a location name is selected, the display image in FIG. 15 returns to the display image in FIG. 14.

Variation of the Embodiment

Figure 17:
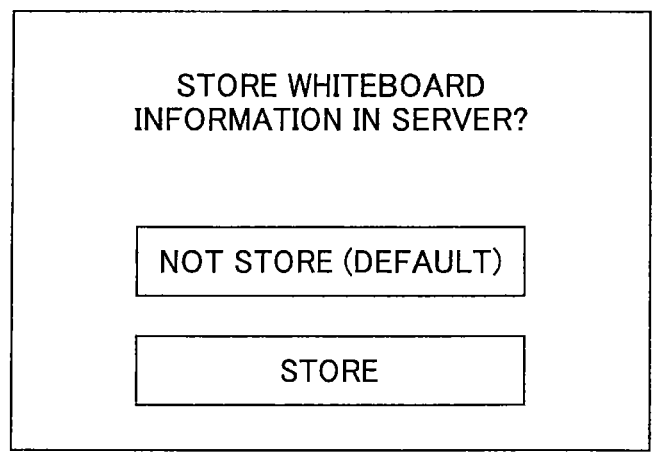
FIG. 17 is a view illustrating yet another example of the displayed image according to the present embodiment.

According to the communication system 1 of the present embodiment, it is possible to switch whether to leave the whiteboard sharing screen or not. In this case, the display control unit 23 of the IWB 20 displays on the display device 220 a screen for receiving an input whether to leave the whiteboard sharing screen or not at an arbitrary timing until the session "sed2" is established. FIG. 17 is a diagram illustrating an example of the display image of the display device.

The transmission/reception unit 21 of the IWB 20 sends to the management system 50 information received by the operation input reception unit 22 at an arbitrary timing until the session "sed2" is established indicating whether to leave the whiteboard sharing screen or not. In a case of selecting not to leave the whiteboard sharing screen, even if image information is sent to the management system 50 from the IWB 20, the storage/readout unit 59 of the management system 50 does not store the image information in the storage unit 5000. Or, the storage/readout unit 59 of the management system 50 may store the image information in the storage unit 5000. But, after the IWB 20 leaves the session "sed2", the image information stored in the storage unit 5000 is erased.

Main Effect of the Embodiment

Next, main effect of the above-described embodiment will be described.

In the session "sed2" among the plurality of IWBs 20 (example of communication terminals), image information "Line, Circle, Text" related to an image output at the plurality of IWBs 20, image information "delete" for stopping output at the plurality of IWBs 20 or the like is transmitted. The storage/readout unit 59 of the management system 50 (an example of an image management system) adds image information sent from the IWB 20 to the management system 50 to an image information management table of an image information management DB 5004 (an example of image management means), each time the image information is transmitted in the session "sed2". Accordingly, in the image information management DB 5004, each piece of image information transmitted in the session "sed2" is managed. The transmission/reception unit 51 of the management system 50 (an example of transmission means) sends each piece of image information managed in the image information management DB 5004 to an IWB 20 which can output an image based on the image information. At this time, since the image information sent to the IWB 20 includes at least each piece of image information "Line, Circle, Text" transmitted in the session "sed2", even in a case where the image shared in the process of communication among the IWBs 20 is erased, the erased image can be reproduced in the IWB 20.

Moreover, since the image information to be sent to the IWB 20 further includes each piece of image information "Delete" transmitted in the session "sed2", a process of forming an image end erasing in the session "sed2" can be reproduce in the IWB 20.

The image information management table of the image information management DB 5004 manages the image information and information indicating creation time of an image in association with each other. The transmission/reception unit 51 sends to the IWB 20 each piece of image information managed in the image information management means and the information indicating the creation time of the image.

Accordingly, in the IWB 20, it is possible to reproduce images in an order of creation based on the information indicating the creation time.

The image information management DB 5004 manages the image information and a communication ID (an example of identification information) of an IWB 20 which is a transmission source of the image information in association with each other. The transmission/reception unit 51 sends to the IWB 20 each piece of image information managed in the image information management DB 5004 and the communication ID of the IWB 20 which is a transmission source of the image information.

Accordingly, on a side of the IWB 20, it is possible to perceive at which IWB 20 a reproduced image is formed.

The transmission/reception unit 21 (an example of a reception means) of the IWB 20 receives each piece of image information sent from the management system 50. The display control unit 23 (an example of output control means) of the IWB 20 controls an output of an image based on the image information received by the transmission/reception unit 21.

Accordingly, in the IWB 20, it is possible to reproduce the image based on each piece of image information.

The transmission/reception unit 21 of the IWB 20 receives each piece of image information sent from the management system 50 and information indicating creation time of the image information. The display control unit 23 of the IWB 20 controls an output of an image based on the image information received by the transmission/reception unit 21 and the information indicating the creation time.

Accordingly, in the IWB 20, it is possible to reproduce images in an order of creation.

An image output from each communication terminal is updated not only by appending an image formed in the process of communication between communication terminals but also by deleting a part of an image. In a case of using the communication system of the related art, there is a problem that even though a finally formed image can be reproduced on the communication terminal, the image formed in the process of communication between the communication terminals cannot be reproduced.

As described above, according to the present embodiment, an effect that an image formed in the process of communication can be reproduced on a communication terminal is provided.

Supplement to Embodiment

In the above-described embodiment, the case, in which a start of communication among three speech terminals 10 and a start of communication among three IWBs 20 are cooperated with each other, is explained. However, the present invention is not limited to the above embodiment. For example, a start of communication among arbitrary numbers (two or more) of speech terminals 10 and a start of communication among arbitrary numbers (two or more) of IWBs 20 may be cooperated with each other.

Respective programs for the speech terminal 10, the IWB 20 and the management system 50 may be stored in a computer readable recording medium (recording medium 106 or the like) as a file in a installable form or in an executable form, and distributed. Moreover, as other examples of the recording medium, a CD-R (Compact Disc Recordable), a DVD (Digital Versatile Disk), a Blu-ray disk or the like may be employed. Moreover, the above-described recording medium or the HD 504 storing these programs may be provided as a program product inbound or abroad.

Moreover, the speech terminal 10, the IWB 20 and the management system 50 in the embodiment may be configured with a single apparatus or may be configured with a plurality of apparatuses to which divided respective parts (functions or means) are assigned arbitrarily.

Moreover, in the above-described embodiment, as an example of an image sharing apparatus, the IWB 20 is explained. The present invention is not limited to this. For example, the IWB 20 may be an electronic blackboard, a personal computer (PC) having an image sharing function or the like.

Furthermore, in the above-described embodiment, the video conference by the image forming apparatus (intermediate concept) such as the IWB 20 (lower concept) is explained. The present invention is not limited to this. The present invention includes an application of the above-described embodiment in a field of communication as a wider concept including the video conference. For example, the above-described embodiment can be applied in a case of sending image information related to an image output at a plurality of communication terminals among the communication terminals in a projector system, a digital signage device, a text sharing system, a car navigation system, a communication system of gaming machines or the like.

Further, the present invention is not limited to these embodiments, but various variations and modifications may be made without departing from the scope of the present invention.

What is claimed is:

1. An image management system comprising:
   processing circuitry configured to
      manage at least a piece of image information among pieces of information transmitted in a first session between a plurality of communication terminals, the piece of image information being related to an image output at each of the communication terminals, and the image output at each of the communication terminals including a plurality of pieces of image information corresponding to separate images that are overlaid upon each other based on different and separate actions performed at respective ones of the communication terminals, the at least a piece of image information corresponding to one of the separate images; and
      send the piece of image information managed by the processing circuitry to a first communication terminal configured to output an updated image based on the piece of image information,
   wherein each of the communication terminals is an interactive whiteboard and at least two of the communication terminals are co-located with respective speech terminals that are configured to communicate at least image data and sound data with each other over a second session of a videoconference that is different than the first session between the plurality of communication terminals, and the processing circuitry is configured to establish the first session between the plurality of communication terminals in response to establishment of the second session of the videoconference,
   wherein the processing circuitry is configured to manage the piece of image information, a piece of generation time information indicating generation time of the piece of image information, and a piece of identification information for identifying a communication terminal that is a transmission source of the piece of image information, in association with each other, and
   the processing circuitry is configured to send the piece of image information managed by the processing circuitry the generation time information indicating the generation time of the piece of image information, and the piece of identification information for identifying the communication terminal that is the transmission source of the piece of image information, to the first communication terminal.

2. A communication terminal comprising:
processing circuitry configured to
receive, from the image management system according to claim 1, the piece of image information; and
control an output of an updated image based on the received piece of image information.

3. A communication system comprising:
a plurality of communication terminals including a first communication terminal; and
the image management system according to claim 1.

4. The image management system according to claim 1, wherein the at least a piece of image information includes stroke information indicating a predetermined type of stroke input at a respective interactive whiteboard.

5. The image management system according to claim 1, wherein the at least a piece of image information includes coordinate information indicating a position at a respective interactive whiteboard where an input was received.

6. The image management system according to claim 1, wherein each interactive whiteboard is configured to output different images on different switchable workspaces, and the at least a piece of image information includes information indicating a particular workspace of a respective interactive whiteboard.

7. The image management system according to claim 1, wherein the processing circuitry establishes the first session between the plurality of communication terminals based at least in part on checking a predetermined association of each of the plurality of communication terminals and the respective speech terminals.

8. The image management system according to claim 1, wherein the processing circuitry establishes the first session between the plurality of communication terminals by sending, to a first one of the plurality of communication terminals, destination information of at least another one of the plurality of communication terminals and causing the first one of the plurality of communication terminals to make a call request to the at least another one of the plurality of communication terminals.

9. A communication terminal comprising:
processing circuitry configured to
receive, from the image management system according to claim 1, the piece of image information and the piece of generation time information indicating the generation time of the piece of image information; and
control an output of an updated image based on the piece of image information and the piece of generation time information indicating the received generation time of the image information.

10. The image management system according to claim 9, wherein the processing circuitry establishes the first session between the plurality of communication terminals based further on checking that the plurality of communication terminals are online.

11. An image management method implemented by an image management system comprising:
adding, to pieces of image information managed by processing circuitry in an image management system, at least a piece of image information among pieces of information transmitted in a first session between a plurality of communication terminals, the piece of image information being related to an image output at each of the communication terminals, and the image output at each of the communication terminals including a plurality of pieces of image information corresponding to separate images that are overlaid upon each other based on different and separate actions performed at respective ones of the communication terminals, the at least a piece of image information corresponding to one of the separate images; and
sending the piece of image information managed by the processing circuitry to a first communication terminal configured to update the outputted image based on the piece of image information,
wherein each of the communication terminals is an interactive whiteboard and at least two of the communication terminals are co-located with respective speech terminals that are configured to communicate at least image data and sound data with each other over a second session of a videoconference that is different than the first session between the plurality of communication terminals, and
the method includes establishing the first session between the plurality of communication terminals in response to establishment of the second session of the videoconference and
the method further includes
managing the piece of image information, a piece of generation time information indicating generation time of the piece of image information, and a piece of identification information for identifying a communication terminal that is a transmission source of the piece of image information, in association with each other, and
sending the managed piece of image information, the generation time information indicating the generation time of the piece of image information, and the piece of identification information for identifying the communication terminal that is the transmission source of the piece of image information, to the first communication terminal.

12. The image management method according to claim 11 further comprising:
receiving at the first communication terminal the piece of image information; and
controlling an output of an updated image based on the received piece of image information.

13. A non-transitory computer-readable storage medium storing a program for causing a computer of an image management system to execute a process of managing an image, the process comprising:
adding, to pieces of image information managed by processing circuitry in an image management system, at least a piece of image information among pieces of information transmitted in a first session between a plurality of communication terminals, the piece of image information being related to an image output at each of the communication terminals, and the image output at each of the communication terminals including a plurality of pieces of image information corresponding to separate images that are overlaid upon each other based on different and separate actions performed at respective ones of the communication terminals, the at least a piece of image information corresponding to one of the separate images; and
sending the piece of image information managed by the processing circuitry to a first communication terminal configured to update the outputted image based on the piece of image information,
wherein each of the communication terminals is an interactive whiteboard and at least two of the communication terminals are co-located with respective speech terminals that are configured to communicate at least image data and sound data with each other over a second session of a videoconference that is different than the first session between the plurality of communication terminals, and the process includes establishing the first session between the plurality of communication terminals in response to establishment of the second session of the videoconference, and the process further includes
- managing the piece of image information, a piece of generation time information indicating generation time of the piece of image information, and a piece of identification information for identifying a communication terminal that is a transmission source of the piece of image information, in association with each other, and
- sending the managed piece of image information, the generation time information indicating the generation time of the piece of image information, and the piece of identification information for identifying the communication terminal that is the transmission source of the piece of image information, to the first communication terminal.

* * * * *